United States Patent
Popper et al.

(10) Patent No.: US 6,323,145 B1
(45) Date of Patent: *Nov. 27, 2001

(54) RAPID FABRIC FORMING FOR PENETRATION RESISTANT FABRIC

(75) Inventors: Peter Popper, Wilmington; Albert S. Tam, Hockessin; William Charles Walker, Wilmington, all of DE (US); Paul Wesley Yngve, Chapin, SC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/064,425

(22) Filed: Apr. 22, 1998

Related U.S. Application Data

(63) Continuation-in-part of application No. 08/953,360, filed on Oct. 17, 1997, now Pat. No. 6,107,220.

(51) Int. Cl.[7] .................... D04H 3/05; B32B 5/12
(52) U.S. Cl. .................. 442/366; 442/389; 442/392; 442/394; 428/902; 428/911
(58) Field of Search ................. 442/394, 366, 442/392, 64, 65, 381, 389; 428/902, 911

(56) References Cited

U.S. PATENT DOCUMENTS

| | | | |
|---|---|---|---|
| 2,919,217 | * 12/1959 | Bobkowicz | 442/366 |
| 2,982,327 | 5/1961 | Vanzo et al. | 152/361 |
| 3,024,828 | 3/1962 | Smith et al. | 152/354 |
| 3,554,826 | 1/1971 | Macaluso | 156/82 |
| 3,575,752 | 4/1971 | Carpenter | 156/73 |
| 3,589,426 | 6/1971 | Varner | 152/361 |
| 3,720,569 | 3/1973 | Kimble | 161/57 |
| 3,728,195 | 4/1973 | Bolles | 156/441 |
| 3,729,365 | 4/1973 | Greene | 161/57 |
| 3,761,341 | 9/1973 | Kimble | 156/446 |
| 3,769,142 | 10/1973 | Holmes et al. | 161/53 |
| 4,030,168 | 6/1977 | Cole | 28/101 |
| 4,161,559 | 7/1979 | Bosse | 428/110 |
| 4,200,937 | 5/1980 | Off et al. | 2/227 |
| 4,325,999 | 4/1982 | Campman et al. | 428/112 |
| 4,366,658 | 1/1983 | Maistre | 52/648 |
| 4,594,122 | 6/1986 | McConnell | 156/433 |
| 4,600,456 | 7/1986 | Oswald | 156/117 |
| 4,631,101 | 12/1986 | Rix | 156/175 |
| 4,830,781 | 5/1989 | Oswald | 152/530 |
| 4,838,966 | 6/1989 | Oswald | 156/117 |
| 5,137,058 | 8/1992 | Anahara et al. | 139/384 R |
| 5,395,691 | 3/1995 | Kavesh et al. | 428/357 |
| 5,482,584 | 1/1996 | Herrmann et al. | 156/172 |
| 5,567,498 | * 10/1996 | McCarter et al. | 428/113 |

FOREIGN PATENT DOCUMENTS

| | | | |
|---|---|---|---|
| 42 12 135 | 10/1993 | (DE) | B65H/81/00 |
| 296 12 448 U 1 | 12/1996 | (DE) | C08L/75/08 |
| 0 265 550 A1 | 10/1986 | (EP) | F41H/5/04 |
| 1 145 298 | 10/1957 | (FR) | . |
| 2 743 821 | 7/1997 | (FR) | D04H/3/04 |
| WO 91/08895 | 6/1991 | (WO) | . |
| WO 98/17852 | 4/1998 | (WO) | D04H/3/04 |
| WO 94/09336 | 4/1994 | (WO) | F41H/5/04 |

* cited by examiner

Primary Examiner—Cheryl Juska

(57) ABSTRACT

This invention is directed to a flexible penetration resistant stabilized composite, that includes an interlaced yarn structure of yarns having a tenacity of at least 8 g/d, a tensile modulus of at least 150 g/d and an energy to break of at least 10 j/g. The yarn structure includes yarn subgroups alternately stacked together. There is also provided a polymeric web coextensive with, in contact with, and bound to the surface of one of the subgroups that at least partially contacts and is bound to the yarns in all the subgroups in the stack to thereby contain the subgroups in the stack in an interlaced yarn structure.

19 Claims, 21 Drawing Sheets

(5 of 21 Drawing Sheet(s) Filed in Color)

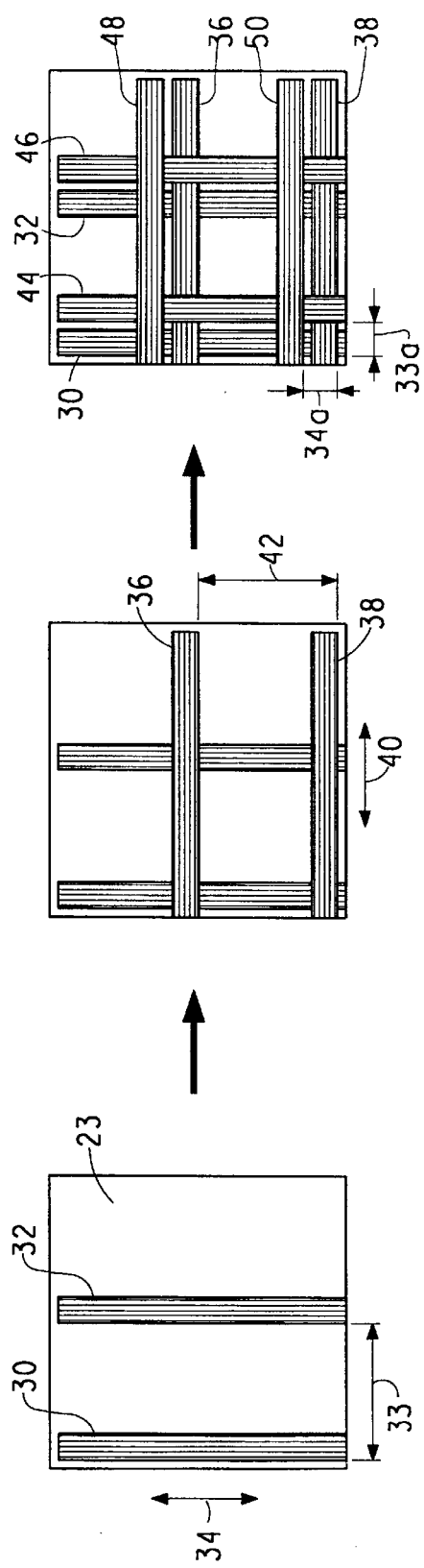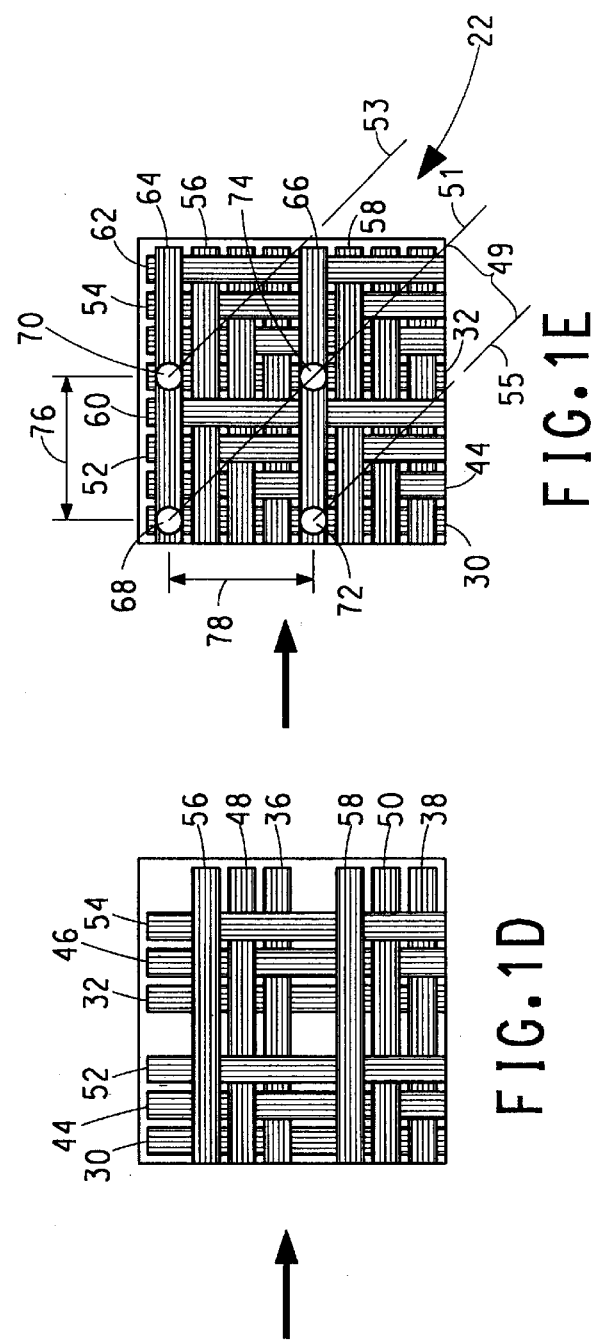

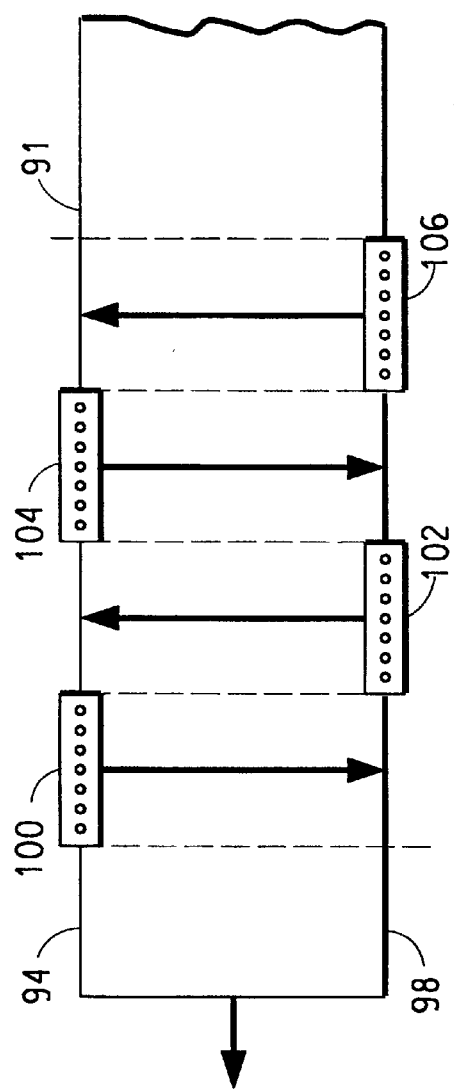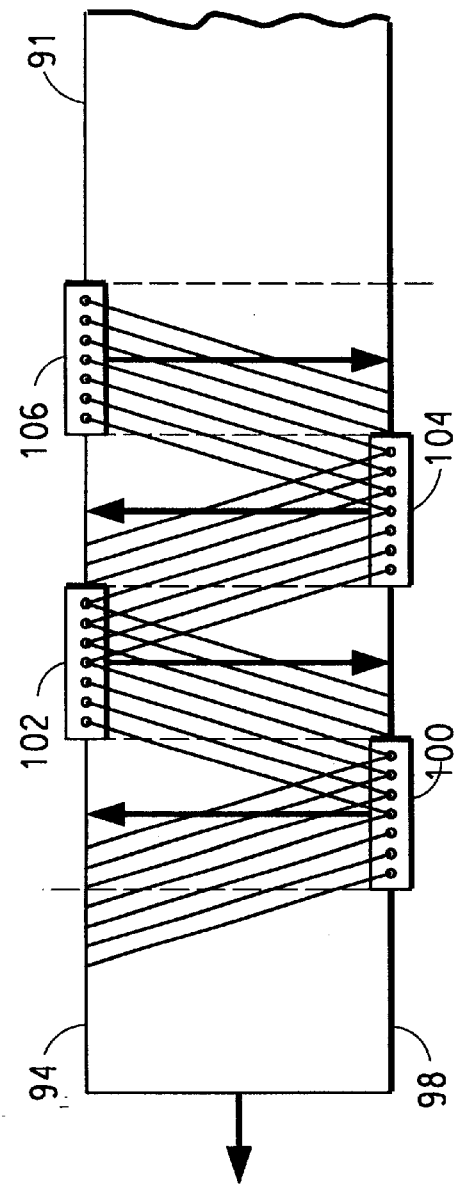
FIG. 8A
FIG. 8B

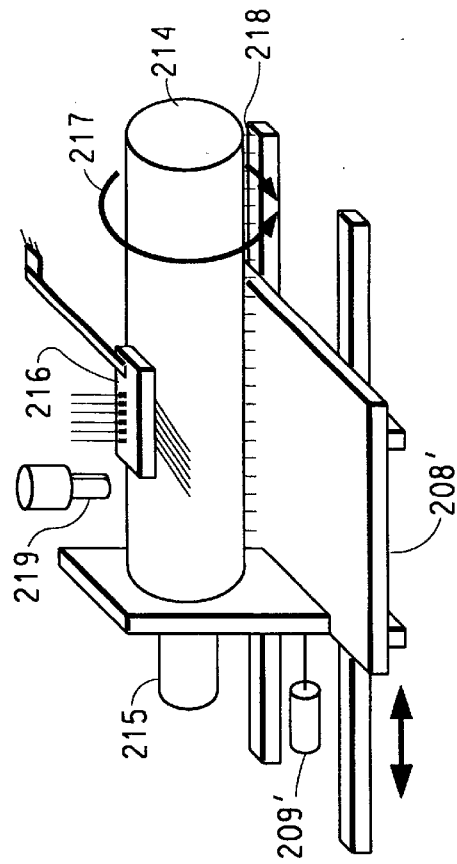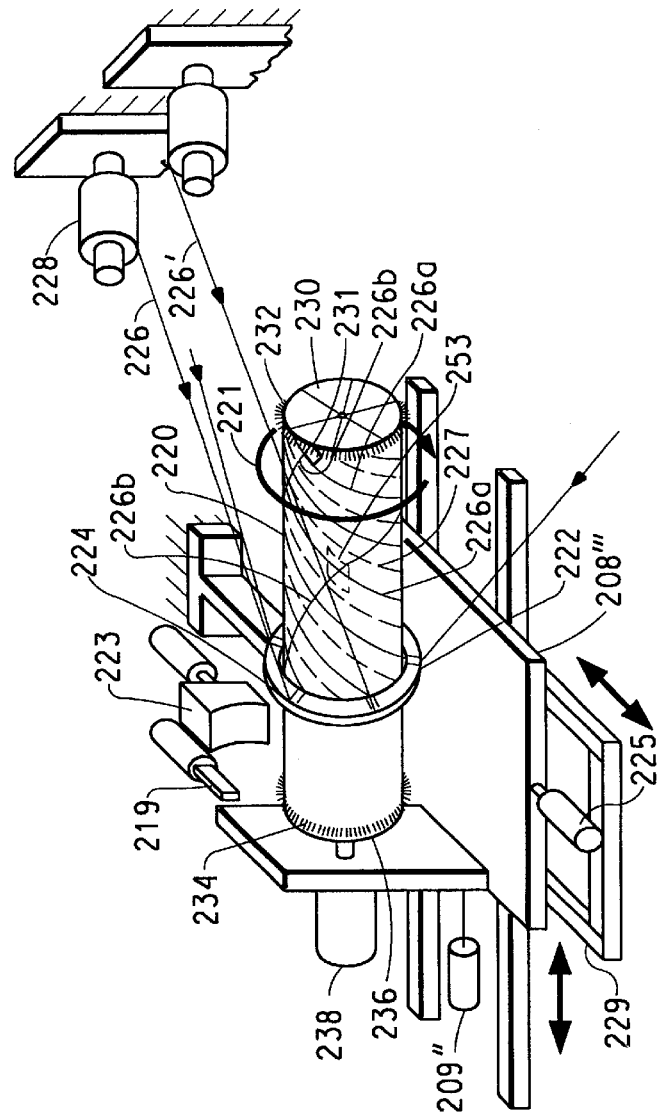
FIG. 11A
FIG. 11B

RAPID FABRIC FORMING FOR PENETRATION RESISTANT FABRIC

CROSS REFERENCE TO RELATED APPLICATIONS

This application is a continuation-in-part of U.S. application Ser. No. 08/953,360, filed Oct. 17, 1997, issued as U.S. Pat. No. 6,107,220.

FIELD OF THE INVENTION

The invention teaches a process and apparatus to rapidly form a flat or shaped fabric and the fabric formed thereby consisting of groups of yarn densely covering an area. Fabrics adapted to function as penetration resistant articles are taught.

TECHNICAL BACKGROUND

Textile fabric to resist penetration is often formed from strands, or filaments, of high strength yarn that are tightly woven and arranged in a layer and then combined with other layers to form a penetration resistant panel. In some cases, each layer may be combined with a resin to bind the yarns together and distribute the penetration force between yarns in each layer. The resin would be a small percent by weight of the layer and the flexibility of the layer would be retained, so the panel would remain flexible. In other cases, the layer is combined with resin and then multiple layers are laminated together under pressure and elevated temperature so the layers are bonded to each other to form a monolithic structure that is a rigid panel often, the rigid layers and panels would use more resin than the flexible layers and panels. Either the flexible or rigid panel can be used in a garment by inserting the panels in pockets in the garment, where the pockets are located in strategic areas of the body of the wearer to protect vital organs. Uses for such a garment would be for example, meat cutter aprons, chainsaw chaps, "bulletproof" vests or overcoats, protective gloves, boots, tents, or the like.

In a process using weaving to hold the strands together, the strands are guided over and under adjacent strands which is a slow process and one that does not permit much variety in forming the fabric unless complex weaving patterns and complex machines are used. In a regular loom for weaving fabrics, individual yarn strands are used and the weft yarns are added one at a time. The yarns are shifted over one another and are forced tightly into position which often causes structural damage to the individual yarns. Coated yarns exhibiting high friction against other yarns cannot be readily woven. For a given weaving process (machine) and yarn denier there is a limit to the number of yarns that can be placed in a given area for a single layer since the yarns cannot readily be overlapped. Binder resin is commonly introduced by the addition of sheets of material to the outer surfaces of the woven fabric. There is a need for a process that permits more variety in placing yarn and resin in fabrics, and a need for a process that rapidly places many yarns at a time without high stress and abrasion to the yarns.

In ballistic layer structures made from yarn, the yarns in the layer generally should completely cover an area without any openings. The yarns should be tightly packed or overlapped so no openings exist in the structure that would make penetration by a projectile or hand held weapon easy. Stacking of the layers would add strength, but basic area coverage would come from each layer.

There is a need for a way to rapidly form a flexible or rigid composite fabric from strands of yarn comprising structural yarn and binder yarn, or comprising strands of structural yarn and binder sheets, or comprising structural yarns coated with binder resin. There is a need for an article that has controlled reliable overlap between individual yarns in a layer to optimize structural yarn use and produce an article that accommodates tolerance variations in yarn and laydown accuracy to provide high quality product yield.

A series of patents to Oswald (U.S. Pat. No. 4,600,456; U.S. Pat. No. 4,830,781; and U.S. Pat. No. 4,838,966) lay down a pattern of partially vulcanized rubber coated strips, or cords, to make a loop of pre-formed reinforcing belt for a vehicle tire. The strips or cords are stuck together wherever they touch to make a relatively stiff structure. The cords are laid in a "zig-zag repeating pattern with succeeding lengths of the strips being displaced from each other. The cord lengths are interleaved with lengths of cords disposed at an opposite angle . . . . This interleaving relationship results in a woven structure". The stickiness of the partially vulcanized rubber apparently holds the cords in place to a forming surface and to each other until the belt is assembled with other elements of the tire and molded under heat and pressure to form a completed tire.

The process practiced by Oswald and others uses one or a few cords that are traversed back and forth across the belt numerous times to complete one circumference. This is believed to result in a stratified structure where the cords in any one stratum are sparsely arrayed, but they do not completely cover the belt area. It is only after repeated zig-zag passes over the belt area that the area becomes sparsely covered with cord. Due to the repeated zig-zag passes of only a few cords, it is believed that within any one stratum there are cords laid down in two different directions that do not cross one another. Cords that cross one another would be in different stratum. These structural features of the reinforcing belts are symptomatic of a process that lays down only a few cords at a time and must make many repeated passes over the belt area to get coverage of the area.

A process taught by Prevorsek et al in U.S. Pat. No. 5,677,029 teaches a penetration resistant composite layer made by bonding a polymeric layer to a fibrous layer. Several of these composite layers are then combined in a laminated structure to form a ballistic structure that resists penetration by bullets. In example 2 where ballistic performance is illustrated, the fabric layer is a woven fabric so the limitations of weaving are still present. The advantage of adding the bonded polymeric layer, is that fewer fabric layers are required and a lower weight structure results to achieve the same ballistic performance as fabric layers without the bonded polymeric layers.

There is a need for a simple non-weaving process that can make penetration resistant fabric structures by laying down many high strength yarns simultaneously over a fabric area to sparsely cover it rapidly and with high accuracy. There is a need for a fabric structure that provides some flexibility in designing how and where to place binding resins in the structure to accommodate different yarns, resins, and manufacturing processes. There is a need for a fabric structure which can accommodate a range of yarns to cover an area so different strength fabric layers can be made with a single machine and yarn just by varying simple machine adjustments. There is a need for a penetration resistant article that has individual yarn overlap in each layer to optimize yarn usage and accommodate tolerance variations in yarn dimensions and laydown accuracy.

SUMMARY OF THE INVENTION

The invention concerns a penetration resistant fabric product and its variations, processes for making the product and variations on such processes. The invention includes a flexible penetration resistant stabilized composite, comprising: an interlaced yarn structure of yarns having a tenacity of at least 8 g/d, a tensile modulus of at least 150 g/d, and an energy to break of at least 10 j/g, the yarn structure further comprising: a plurality of first yarn subgroups having a plurality of yarns oriented in a first angular direction free of crossings, the first yarn subgroups forming a stack with a plurality of second yarn subgroups having a plurality of yarns oriented in a second angular direction free of crossings; the yarns in each subgroup following substantially parallel paths that are spaced apart in a repeating pattern to sparsely cover common predetermined fabric area; the yarn subgroups are alternately stacked with a first subgroup next to a second subgroup, wherein the yarns in the first subgroup cross the yarns in the second subgroup; the yarns in any one subgroup of the plurality of first subgroups are offset from the yarns in all other subgroups of the plurality of first subgroups, or the yarns in any one subgroup of the plurality of first subgroups are partially overlapped with at least one of the yarns in the other subgroups of the plurality of first subgroups; the yarns in any one subgroup of the plurality of second subgroups are offset from the yarns in all other subgroups of the plurality of second subgroups or the yarns in any one subgroup of the plurality of second subgroups are partially overlapped with at least one of the yarns in the other subgroups of the plurality of second subgroups; the stacking of all of the plurality of first subgroups forming a first yarn group comprising yarns that densely cover the predetermined area, and the stacking of all of the plurality of second subgroups forming a second yarn group comprising yarns that densely cover the predetermined area; and a first polymeric layer comprising a thermoplastic resin, a thermosetting resin or a combination thereof which layer is coextensive with, in contact with, and at least partially bound to the top surface of the stack of yarns, and a second polymeric layer comprising a thermoplastic resin, a thermosetting resin or a combination thereof which layer is coextensive with, in contact with, and at least partially bound to the bottom surface of the stack of yarns; wherein the first, and second polymeric layers comprise 5 to 25% by weight of the composite, and the polymeric layers stabilize the yarns in the subgroups in the stack, to thereby contain the subgroups in the stack in an interlaced yarn structure.

The flexible penetration resistant stabilized composite may further comprise at least a third polymeric layer comprising a thermoplastic resin, a thermosetting resin or a combination thereof which is coextensive with, in contact with, and at least partially bound to the yarns intermediate the top and bottom surfaces of the stack, and wherein the third polymeric layer is bonded to the top and bottom polymeric layers at spaced locations throughout the structure.

Another embodiment is a flexible penetration resistant stabilized composite panel which comprises a plurality of layers of the above composite that are arranged with top and bottom surfaces adjacent one another to form a flexible composite article, or wherein the plurality of layers are bonded to each other and consolidated to form a rigid article.

In the above embodiments, the polymeric layers may be in the form of a web or film, a fibrous network, or a fibrous network in a polymer matrix.

Another embodiment of a flexible penetration resistant stabilized composite, comprises, as a replacement for the aforementioned polymeric layers, a plurality of spaced binder yarns introduced coextensively with a predetermined yarn of each subgroup, the binder yarns distributed at predetermined positions relative to the subgroup yarns, the binder yarns comprising a thermoplastic resin, a thermosetting resin or a combination thereof;

wherein the binder yarns comprise 5 to 25% by weight of the composite, and the binder yarns at least partially contact and are bound to other yarns in the stack, to thereby contain the subgroups in the stack in an interlaced yarn structure.

The just mentioned embodiment with binder yarns may be arranged with top and bottom surfaces adjacent one another to form a flexible composite article or panel, or the plurality of layers may be bonded to each other and consolidated to form a rigid article or panel.

BRIEF DESCRIPTION OF THE FIGURES

The patent or application file contains at least one drawing executed in color. Copies of this patent or patent application publication with color drawings will be provided by the office upon request and payment of the necessary fee.

FIGS. 1A–E show plan views of a progression of yarn laydowns to form a basic two group (two-directional or biaxial) flexible fabric from a plurality of multiple-yarn subgroups.

FIGS. 8A–B show another apparatus for continuously forming a two dimensional biaxial yarn fabric similar to that of FIG. 7.

FIG. 11A shows a mandrel apparatus for making a single batch of two-dimensional or three dimensional fabric structure.

FIG. 11B shows a mandrel apparatus for making a tubular batch of fabric structure.

DETAILED DESCRIPTION

Figures 2A, 2B:
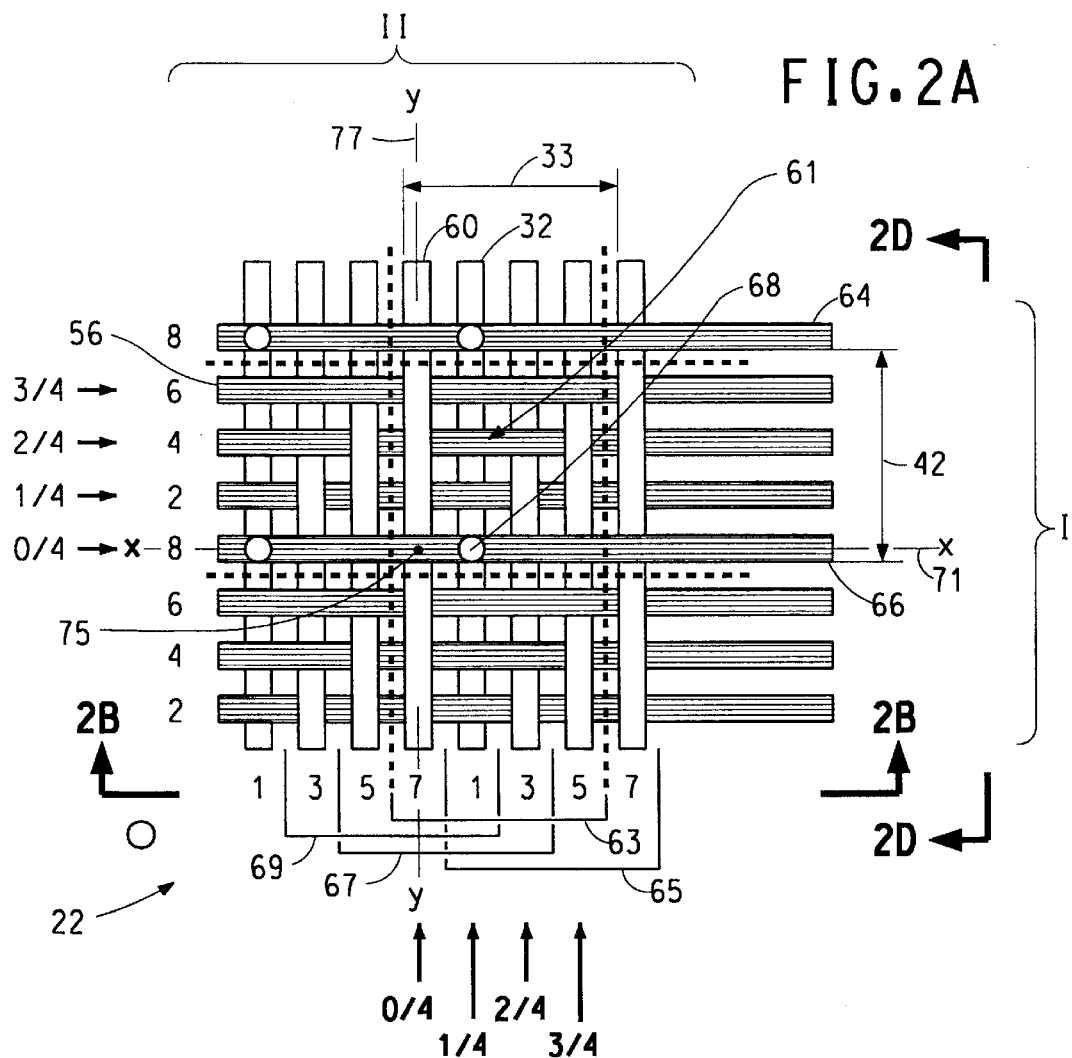
FIGS. 2A–F show plan and side views of the yarn subgroups of basic cells of the fabric.

FIGS. 1A–E show a simplified basic structure and process for forming a two-directional or biaxial yarn fabric 22 (FIG. 1E) of the invention on a planar surface 23. In FIG. 1A, two yarns 30 and 32 are laid down in a first direction, such as a ninety degree direction 34. Yarns 30 and 32 are spaced apart a cell distance, or space, 33 which may be about 3–20 yarn diameters (preferably 4–16, and most preferably 4–8); about four diameters are shown here to provide 4 positions for yarns to be laid down spaced from, or offset from, the other yarns in that direction. In FIG. 1B, two yarns 36 and 38 are laid down in a second direction, such as a zero degree direction 40, and on top of the first yarns. Yarns 36 and 38 are also spaced apart a cell distance, or space, 42 which is the same magnitude as cell distance 33 for these yarns of the same width. For yarns of different widths or for special effects, cell distances 33 and 42 may be different. In FIG. 1C, two yarns 44 and 46 are spaced apart at distance 33 and in direction 34, and are placed adjacent yarns 30 and 32, respectively. They would be spaced at a predetermined step distance of 33a and 34a, respectively, and on top of yarns 36 and 38. Two yarns 48 and 50 are then spaced apart at distance 42 and in direction 40, and are placed adjacent yarns 36 and 38 respectively, and on top of yarns 44 and 46. In FIG. 1D, two yarns 52 and 54 are spaced apart at distance 33 and in direction 34, and are placed adjacent yarns 44 and 46 respectively, and on top of yarns 48 and 50. Two yarns 56 and 58 are then spaced apart at distance 42 and in direction 40, and are placed adjacent yarns 48 and 50 respectively, and on top of yarns 52 and 54. In FIG. 1E, two yarns 60 and 62 are spaced apart at distance 33 and in direction 34, and are placed adjacent yarns 52 and 54 respectively, and on top of yarns 56 and 58. Two yarns 64 and 66 are then spaced apart at distance 42 and in direction 40, and are placed adjacent yarns 56 and 58 respectively, and on top of yarns 60 and 62.

This completes the yarn lay-down and a basic planar fabric structure 22 has been created of a plurality of yarns that are held in place now only by friction and gravity. It remains to secure the yarns in place. This is done in the simplest manner by attaching the top yarns 64 and 66 to the bottom yarns 30 and 32 where they cross at points 68, 70, 72, and 74. This now traps all the yarns in the structure together so they can not be removed in the manner in which they were assembled.

The structure shown in FIG. 1E is also shown in FIG. 2A expanded slightly and the ends of the yarns extended for purposes of further discussion. The structure as illustrated in FIG. 2A has a characteristic structure, or cell 61, that would be repeated in a large area of the fabric; it is shown outlined by heavy dashed lines. There is a crossing point between the uppermost yarns and lowermost yarns in each cell of this structure, such as point 68 in cell 61 where an uppermost yarn 66 crosses a lowermost yarn 32.

Figure 2C:
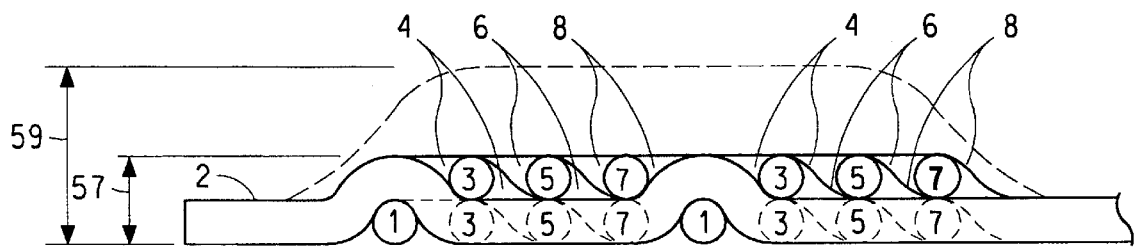

FIG. 2B shows a side elevation view 2B—2B of fabric 22 in FIG. 2A where the yarns are shown schematically as rigid elements. It will be appreciated that since the yarns are flexible, if untensioned they will bend over and under one another in the structure and collapse to about a two-to-four yarn thickness so it will be difficult to pull unbonded yarns from the structure. This over and under path of a yarn in a structure is referred to in the fabric art as interlace. The more interlace that is present, the more the fabric is stable and the yarns tend to stay in place without shifting and opening up holes in the fabric. That is, the fabric has good integrity. This is a desirable feature for maintaining the covering ability of the fabric over an area. A representation of a fully collapsed structure is depicted in FIG. 2C where the structure in FIG. 2B is shown collapsed and the individual yarns in each subgroup 1–8 are identified. The fully collapsed thickness at 57 is about the thickness of an individual yarn of one group in one direction, 34, stacked on top of an individual yarn of the other group in the other direction, 40. This fully consolidated thickness is about two yarn diameters which may be achieved by urging the yarns together with an increased amount of bonding. In the case of a penetration resistant article, it may be desirable to minimize the bulk and fully collapse the structure with bonding over the entire fabric area. By controlling the bonding to be the minimum as shown in FIG. 2A, the fabric structure may be much bulkier and achieve a thickness 59 of 3–4 yarn diameters. This is 1–2 times bulkier than if the same yarn were used in a woven structure. Alternatively, a less expensive, lower bulk yarn with less texture and/or crimp could be used in the structure of the invention to achieve the same bulky fabric as a woven structure using a more expensive high-bulk yarn. This is a unique advantage of the fabric of the invention.

Figure 2D:
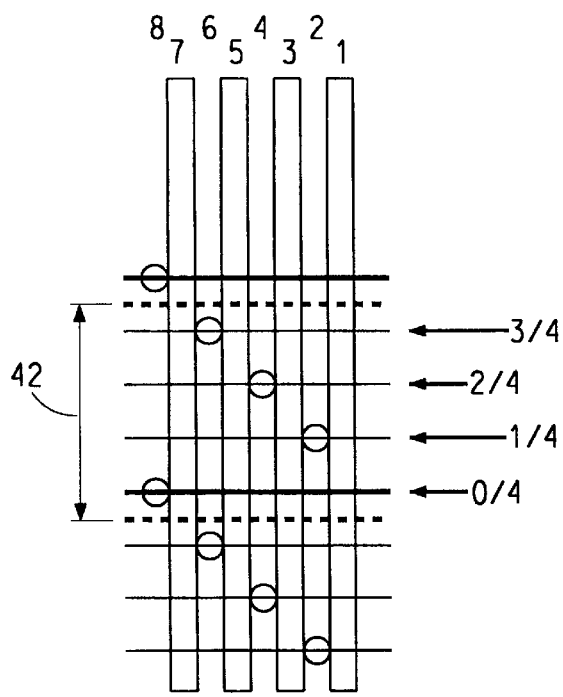
Figure 2E:
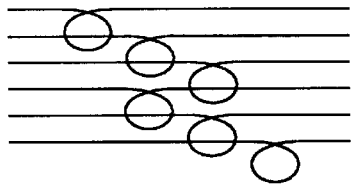
Figure 2F:
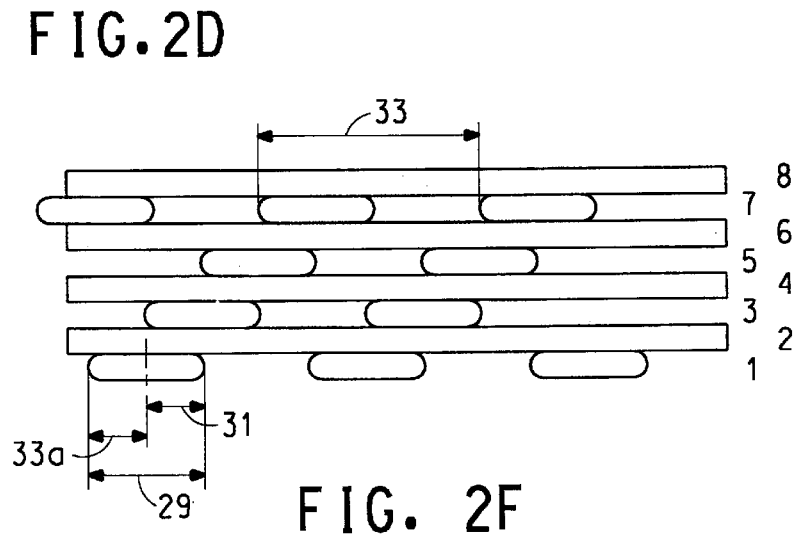

FIG. 2F is a view similar to FIG. 2B with the exception that the individual yarns in a subgroup of one group of the structure are partially overlapped (in a plan view) with individual yarns in another subgroup of the same group. In this case, the offset distance or step distance 33a (FIGS. 1C and 2F) is less than the width 29 of the yarn; in the case illustrated in the figure, the step distance is about ½ of the yarn width resulting in an overlap 31 between the subgroup 1 yarns in the 90 degree group II, and the subgroup 3 yarns of that group. In some cases where the width of the yarns varies noticeably, the step distance may be conveniently measured from the centerline of each yarn. This overlap of individual yarns permits some tolerance variation in the yarn width 29 and the step distance 33a without opening up holes in the fabric. This type of construction is useful when the fabrics are to be used as penetration resistant fabrics.

It is useful to develop some special definitions to discuss the general features of the invention referring to FIGS. 1E, 2A and 2B:

yarn—a predominantly one dimensional, elongated, flexible, fabric element essentially continuous in length such as a strand, fiber, filament, wire, rope, tape, ribbon, tow, thread, tube, string, or the like made up of one or more subelements that may be continuous in length (such as a continuous multi-filament yarn) or discontinuous in length (such as a staple yarn).

cell—a cell is the smallest section of a fabric where the yarn pattern appears to repeat over most of the fabric structure, and where, to establish a convention, the topmost yarn, such as yarn 66, lies along one side of the cell and the next topmost yarn, such as yarn 60, lies along the other side of the cell (other repeating units of the cell could be chosen if desired or the borders established at the bottom side of the fabric). In FIG. 2A, a complete cell is shown as cell 61. In some structures, the edges of the fabric may only have partial cells, or there may be several cells in a fabric with slightly different yarn laydown patterns that will repeat in the fabric. In some fabrics, there may be highly variable or very large cell repeats and it may not be useful to designate a cell; the entire fabric may be referred to as a cell.

group of yarn—a group of yarn comprises all the yarns in a fabric or cell in a given direction, such as a zero degree direction or a ninety degree direction. In FIG. 2A, the zero degree yarn group for all cells is designated by the Roman numeral I, and the ninety degree yarn group for all cells is designated by the Roman numeral II. The yarns in a group form a dense covering of yarn over an area and the yarns in a group follow substantially parallel paths which may include curved paths or looped paths where a given yarn may cross itself. To achieve the most dense covering, the yarns would all be non-intersecting and preferably parallel; for less dense covering, this is not necessary.

cell space or cell distance—the cell space is the length of the side of a cell that determines the space available for the number of non-intersecting, non-overlapping yarns in a group. For simple repeating cells, this dimension defines the yarn spacing between sparsely spaced yarns in a subgroup (see below). For group II, the cell space is shown at 33; for group I, the cell space is shown at 42. Within the cell space 33 or 42 shown in FIGS. 1A, 1B, and 2A, there are four positions for the yarns in that group that are offset from one another. For the cell shown in FIG. 2A identified using the conventions developed, the cell space 33 is seen between the top yarns 64 and 66.

subgroup of yarn—a subgroup is a plurality of yarns making up a sparse subdivision of a group. All yarns in one subgroup are in place before the succeeding subgroup is put in place, which characterizes the yarns in a subgroup. The yarns in a group are stacked in subgroups with yarns of other groups. In FIGS. 2A, 2B and 2C the total of eight subgroups for a complete cell are labeled 1–8, with all the yarns in a subgroup given the same number; subgroups 1, 3, 5, 7 make up group I for cell 61 and subgroups 2, 4, 6, 8 make up group II for cell 61. Each subgroup considered by itself is a sparse covering of yarns over the fabric area. Generally, the yarns in a subgroup can all be laid down simultaneously and are all oriented in the same general direction. For instance, the yarns labeled 1 make up subgroup 1 and they are spaced apart at cell spacing 33. The yarns labeled I comprise the lowermost subgroup of group I and also the cell, and they are stacked against the yarns labeled 2 in the lowermost subgroup of group II in the cell. The yarns in the different subgroups in group I are non-intersecting, that is, in a plan view they do not lay on top of one another, although in special cases involving yarn loops, an individual yarn in a subgroup may cross itself and other subgroup yarns as in FIG. 2E. For penetration resistant fabrics, yarns in one subgroup of a group may partially overlap yarns in an adjacent subgroup of that group.

yarn position—the yarn position in a given group refers to the location in a cell where a yarn is placed relative to a preselected reference yarn in the same group. Within the distance of a cell space, there are a finite number of yarn positions available for the yarns in the subgroup of a group that are substantially parallel and offset from one another, given a nominal width of a yarn. In a penetration resistant fabric, this finite number can be increased by partially overlapping the yarns as explained. In a preferred convention, an X-axis is placed over an uppermost yarn in the cell and a Y-axis is placed through an origin defined by the intersection of the uppermost yarn and a yarn in the next subgroup that crosses the uppermost yarn. For the sake of convention, the cell would be defined as the repeating unit of yarn structure that has one edge adjacent the X-axis and the X-Y origin in the lower left corner of the cell. The yarn position for a subgroup can then be defined as the fraction of the total number of possible yarn positions spaced from the reference yarn, with the reference yarn being in the zero-th position. If the paths of the yarns are not straight, unlike the example of FIGS. 1A–E and 2A, the X-axis would align with the predominant non-straight path which may be the axis of symmetry of the yarn path, in the case of a sinusoidal or zigzag path. The yarns in the figures are shown spaced apart for clarity, although in determining the number of yarn positions available in a cell, it is assumed the yarn widths are abutted. In cell 61 of FIG. 2A, the uppermost yarn 66 in subgroup 8 of group II is selected as the reference yarn and is coincident with an X-axis 71. The yarn 60 in the next subgroup 7 of the cell 61 crosses the reference yarn 66 in subgroup 8. Where it crosses reference yarn 66 defines an origin 75 through which a Y-axis 77 passes. The subgroup positions of the group I yarns within the cell 61 are labeled 0/4, 1/4, 2/4, 3/4 with subgroup 8, represented by the uppermost yarn 66, in the 0/4 position and the sign determined by the direction of the Y-coordinate where the yarn crosses the Y-axis. The subgroup positions of the group II yarns within the cell 61 are labeled 0/4, 1/4, 2/4, 3/4, with subgroup 7, represented by the next yarn 60, in the 0/4 position and the sign determined by the direction of the X-coordinate where the yarn crosses the X-axis. Referring to FIGS. 2A and 2B, the yarns in subgroup 1 of group II, such as yarn 32, are in the 1/4 position in the cell shown, which is the −1 location of 4 possible positions. Referring to FIGS. 2A and 2D, the yarns in subgroup 6 of group I, such as yarn 56, are in position 3/4 in the cell shown, which is the −3 location of 4 possible positions.

In FIG. 1E, four yarns are used to fill space 33: yarn 30, 44, 52, and 60. From a practical standpoint, the size of each space 33 and 40 determines the length of unsecured yarn on the top and bottom surfaces of the fabric structure, such as length 76 in the zero degree uppermost yarn 64, and length 78 in the ninety degree lowermost yarn 30 in FIG. 1E.

Figure 3A:
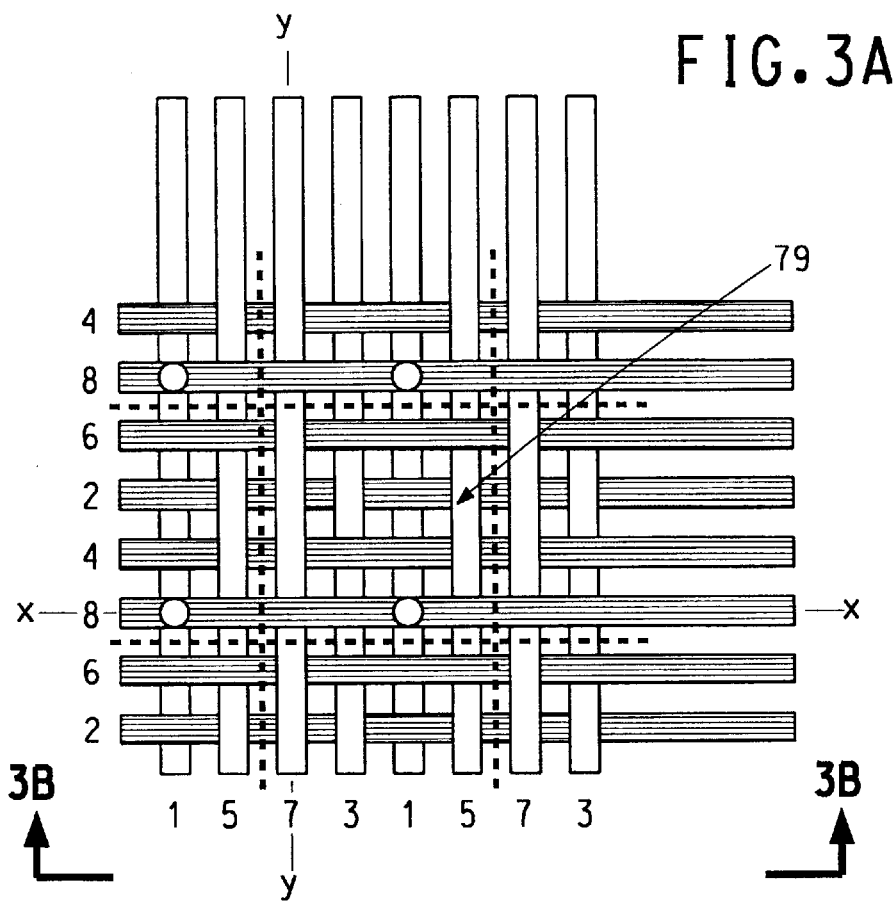
FIGS. 3A–C show plan and elevation views of variations in yarn arrangement in a cell.
Figure 3B:
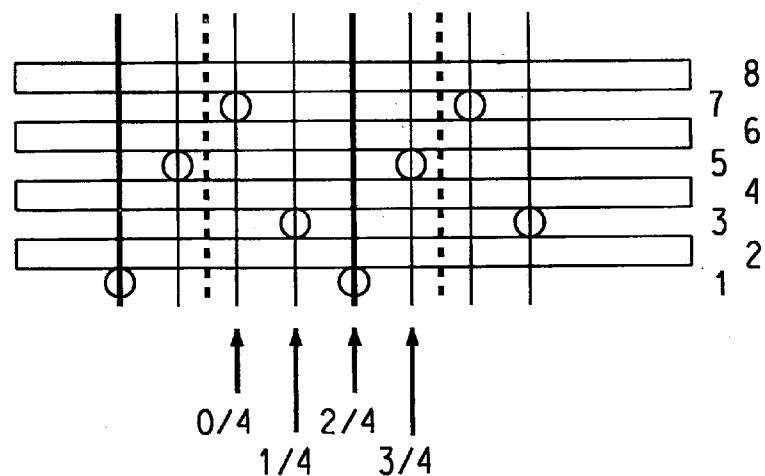
Figure 3C:
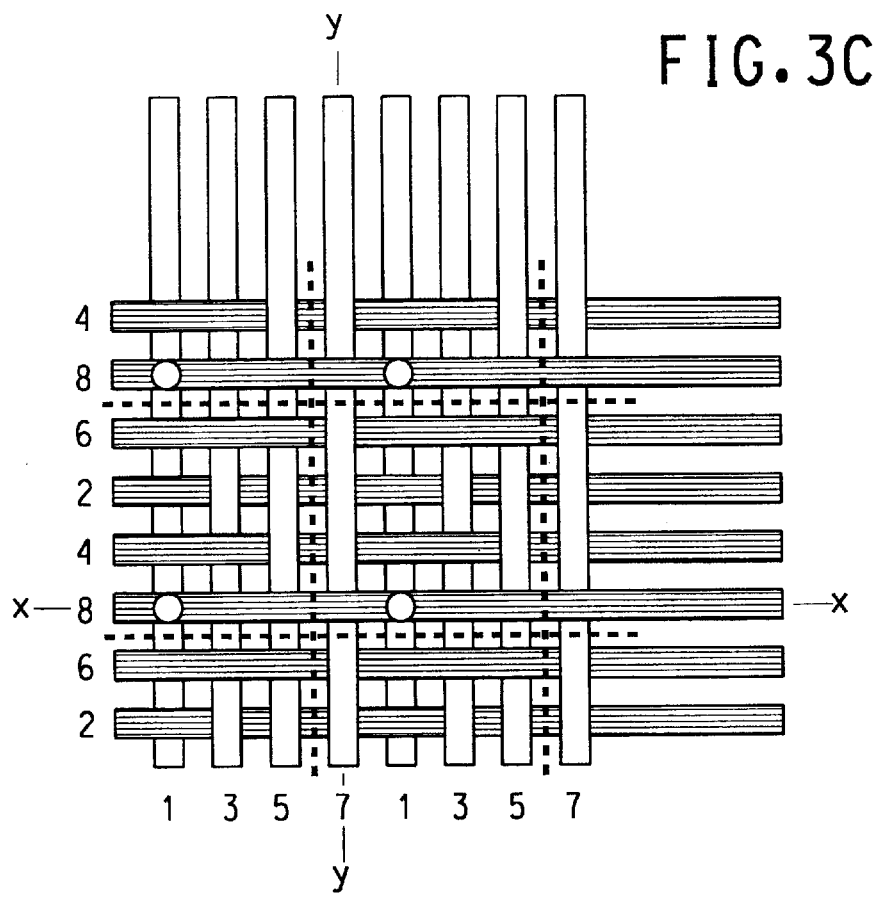
Figure 4B:
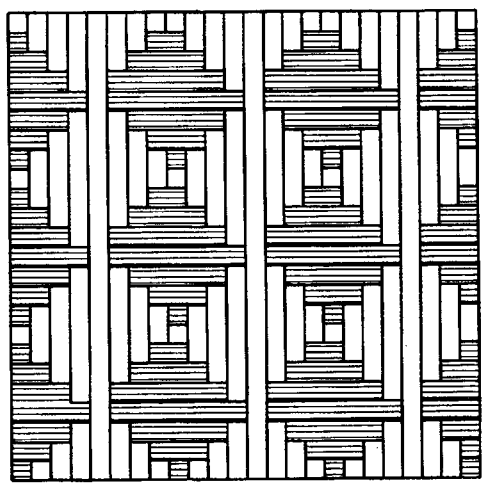
FIGS. 4A–E show plan views of additional biaxial fabric or yarn structures.
Figure 4A:
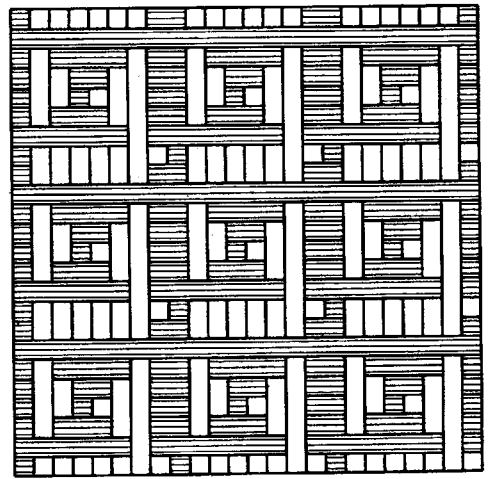

There are various patterns possible for laying down the subgroups of yarn. All yarns in one subgroup are in place before the succeeding subgroup is put in place, which characterizes the yarns in a subgroup. FIG. 2A shows the basic module of fabric structure shown in FIG. 1E where the sequence of subgroup placement going from left to right is 1-3-5-7 in each ninety degree group and going from bottom to top of the figure is 2-4-6-8 in each zero degree group. In FIG. 3A, the sequence of subgroup placement going from left to right is 1-5-7-3 in each ninety degree group; the sequence of subgroup placement going from bottom to top of the figure is 2-6-8-4 in each zero degree group. FIG. 3B is an elevation view 3B-3B of FIG. 3A and shows the position of the subgroups in cell 79 in FIG. 3A. FIG. 3C shows another pattern where the ninety degree yarns were shifted as in FIG. 2A (1-3-5-7) and the zero degree yarns were shifted as in FIG. 3A (2-6-8-4). As can be seen, various patterns of yarn shifts in each subgroup are possible to vary yarn patterns or structural features as desired, and the zero degree and ninety degree subgroups may be shifted differently. Another variation is shown in FIG. 4A where the yarns in succeeding subgroups are placed in the middle of the cell space remaining to produce a different looking pattern of yarns. In general, the placement in FIG. 4A is less preferred; rather it is preferred to place the yarns in succeeding subgroups adjacent a yarn in a preceding subgroup. This results in improved accuracy of yarn placement and restraint of yarn movement in the direction of the adjacent yarn during buildup of the structure before bonding. FIG. 4B shows still another pattern.

The actual steps followed by a yarn placement device for sequentially placing the subgroups may also be varied further as desired. For instance, referring to FIG. 2A and the ninety degree group, a device may step through the numerical sequence 1, 3, 5, 7 as seen in brackets 63, or 65, or 67, or 69; the zero degree group may be varied similarly. The steps followed will not affect the appearance and structure of the pattern in the mid-section of the fabric structure, but may be used to determine the appearance along the edge of the fabric.

Means of connecting the top and bottom yarns are possible other than by connecting only the points of overlap. In one preferred embodiment, an ultrasonic horn is traversed across the structure diagonally in a path 51, such as through point 68 and point 74 (FIG. 1E), to continuously bond all the yarns in the path to their overlapping neighbors. A parallel path 53 would run through point 70 and another parallel path 55 would run through point 72 so a plurality of ultrasonically bonded pathways would exist to hold the structure together. Alternatively, the bond pathways could run from point 68 to 70 or 68 to 72. In practice, the paths would not have to pass directly through points 68, 70, 72 and 74 to effectively trap the yarns in the structure. What is important is that the top yarns and bottom yarns are connected to other yarns that are eventually connected to one another, so the top yarns are eventually connected by a series of connections to the bottom yarn. This "pathway process" of connecting is beneficial in that precise location of the bonds at the top and bottom yarn overlap points is not required, although it is still preferred. Such a spacing of paths as just discussed results in a bonding frequency that is low enough to retain the inherent flexibility of the yarns in the structure in spite of the high frequency of molten polymer fused bonds. The bond pathways form a bonded region in the fabric structure and can be used to control the fabric bulk. Between the bond pathways, such as paths 51 and 55 there is an unbonded region 49 where the yarns remain unbonded and unconnected so the inherent flexibility of the yarn used in the structure is retained. It will be appreciated that to make a fabric structure of a practical size, a great many yarns would be used and many bonded regions and unbonded regions would be employed.

In some cases, fabric flexibility is not of paramount importance, and the fabric may be bonded over a large percentage of its surface. For instance, if non-thermoplastic yarns are used for the structure whereby individual structural yarns cannot be attached to one another, a thermoplastic web group may be placed at any subgroup level, such as at an intermediate subgroup or at one or both of the two outer subgroups (top and bottom surfaces) and the fabric bonded continuously over the entire surface to attach a portion of each yarn to a portion of the web group. In this case flexibility of the fabric is still retained due to the thinness of the fabric, but the inherent flexibility of the yarn before bonding is diminished. Alternatively, a significant number of thermoplastic binder yarns may be distributed throughout the yarn structure and continuous bonding applied to melt all the binder yarns thereby attaching the non-thermoplastic structural yarns to each other at many points.

Figure 4C:
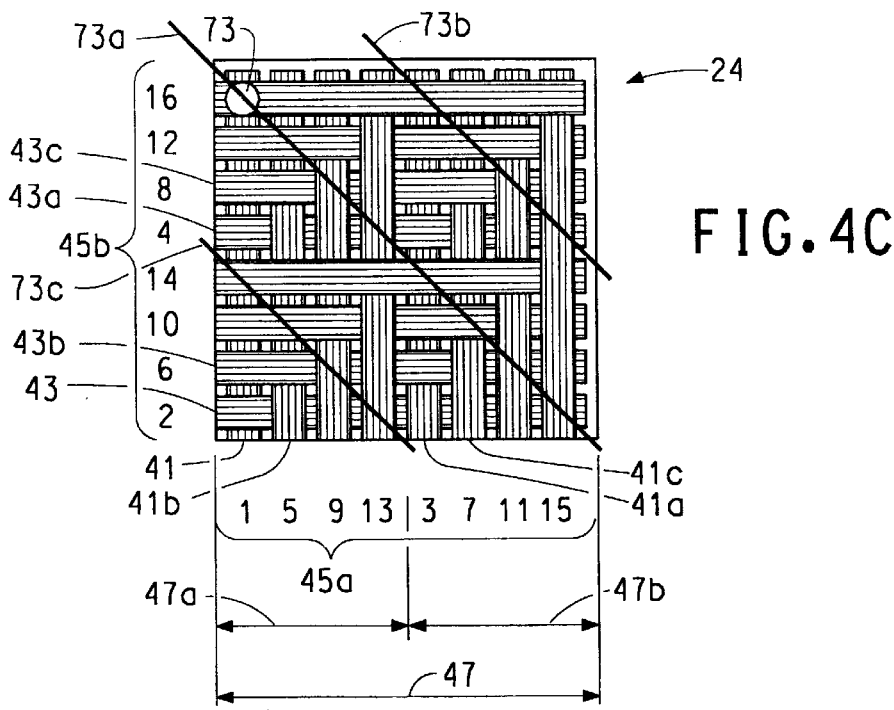

FIG. 4C shows a small area of a portion of a fabric with a pattern that resembles that in FIG. 1E (also 2A). The small area fabric portion 22 shown in FIGS. 1E/2A, referred to as a simple cell/single step pattern (or just the simple cell pattern), can be made with four passes of two yarns in each group, such as four passes of two feed yarns 30 and 32 in the ninety degree direction; alternated with four passes of two feed yarns 36 and 38 in the zero degree direction. In each sublayer the succeeding yarns are placed next to the previous yarns at a single yarn step away. This fabric could be rapidly made in this manner. An equivalent fabric portion 24 shown in FIG. 4C was made with eight passes of only a single feed yarn in each group, such as eight passes of feed yarn 41 in the ninety degree direction alternated with eight passes of feed yarn 43 in the zero degree direction. If the numbered sequence shown at 45a is followed for the ninety degree feed yarn 41, and the numbered sequence shown at 45b is followed for the zero degree feed yarn 43, a pattern very similar to that in FIGS. 1E/2A is produced. The pattern in the fabric portion made as in FIGS. 1E/2A shows four cells of fabric with four yarns per cell side, and the pattern in the fabric portion made as in FIG. 4C shows one cell of fabric with eight yarns per cell side. Some visual differences in the fabric can be observed looking at the lower right quadrant of the two fabrics where it is seen that in FIG. 2A (same as 1E), subgroup 5 passes under subgroup 6, and subgroup 7 passes under subgroup 8; but in the equivalent fabric in FIG. 4C, subgroup 11 passes over subgroup 10 and subgroup 15 passes over subgroup 14.

This pattern in FIG. 4C is referred to as the split cell/single step pattern (or just the split cell pattern) since the second yarn laid down in each group of yarns, 41a and 43a, splits the cell distance, such as distance 47, into some cell fraction, such as ½ cell, as shown by the equal split cell distances 47a and 47b. The succeeding yarns in each group, such as yarns 41b and 43b, are then laid down next to previous yarns, such as yarns 41 and 43 respectively, at a single yarn step away in the first split cell distances, such as 47a. Also succeeding yarns in each group, such as yarns 41c and 43c, are then laid down next to previous yarns, such as yarns 41a and 43a respectively, at a single yarn step away in the second split cell distances, such as 47b. In this way, the two or more split cell fractions are built up together. When the cell is completed, the top and bottom yarn intersection is bonded as at 73. Additional bond lines similar to those shown at 51, 53, and 55 in FIG. 1E could also be utilized to bond more of the yarns to each other, as shown at 73a, 73b, and 73c in FIG. 4C. More or fewer bond lines may be utilized as desired. For the simple cell/single step pattern and split cell/single step pattern, and any other similar pattern which produces good yarn interlace, it may be possible to use fewer than the suggested one bond per cell over a large fabric pattern that has many cells and bonds.

Figure 4D:
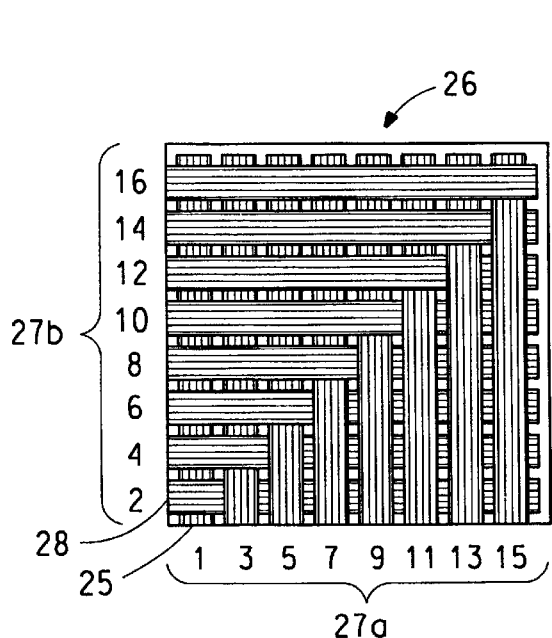

FIG. 4D shows, for comparison, a fabric 26 made using the simple cell pattern as in FIGS. 1E/2A but using eight yarns per cell distance instead of only four. Only a single feed yarn for each group of yarns would be needed for the area of fabric shown in this single cell. The numbered sequence shown at 27a is followed for the ninety degree feed yarn 25, alternating with the numbered sequence shown at 27b which is followed for the zero degree feed yarn 28. This single cell pattern covers the same area as the four cell area of FIG. 1E/2A or the single cell area FIG. 4C, but it has a large number of long unsecured yarn lengths which may be undesirable for some applications. when placing down a large number of yarns per cell (8 or greater), and using spot bonding or partial area bonding, it is preferred to use the split cell pattern to minimize the number of long unsupported yarn lengths.

Figure 4E:
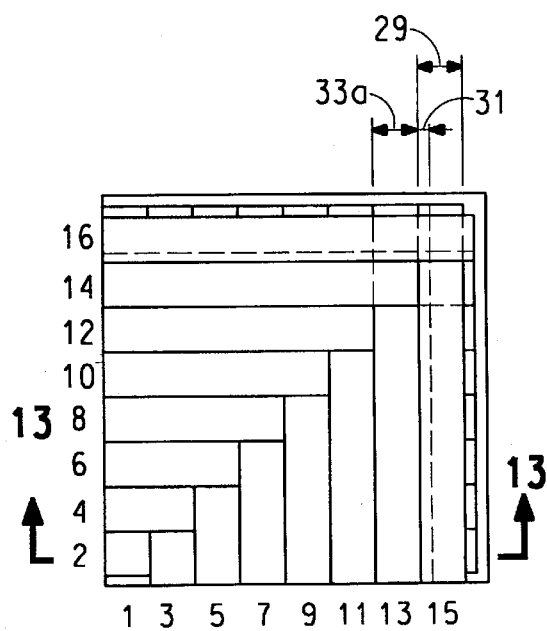

FIG. 4E shows the use of wider yarns than those of FIG. 4D which results in an overlapping arrangement useful for a penetration resistant fabric. Alternatively, more of the narrower yarns of FIG. 4D (say 10 or 12 instead of 8) could be used in the same cell size to produce an overlapping arrangement. The offset distance or step distance 33a is less than the yarn width 29 which results in overlap 31 between the subgroup 13 and subgroup 15 yarns of the 90 degree group of yarns 1, 3, 5, 7, 9, 11, 13, 15.

A pattern of abutted yarns or overlapped yarns, as in FIG. 4E, are particularly advantageous for making fabrics to resist penetration, such as by sharp objects or ballistics particles like shrapnel or bullets. Uses for such a fabric would be in a garment containing multiple layers of the fabric that could be used, for example, as meat cutter aprons, chainsaw chaps, "bulletproof" vests or overcoats, protective gloves, boots, tents, or the like. Such a penetration resistant fabric would be preferably formed from strands, or filaments, of high strength yarn that is arranged to completely cover an area without holes evident in the surface to form a layer which would be a building block for a garment. The layer would be stabilized and further consolidated, if necessary, and combined with other layers to form a penetration resistant article. Preferably, each layer would be combined with a resin to bind the yarns together and distribute the penetration force between yarns in each layer and to prevent shifting of the yarns. The resin would be a small percent by weight of the layer and the flexibility of the layer would be retained, so the panel would remain flexible. Preferably, the resin varies from 2% to 40%, by weight, and more preferably from 5% to 25%, by weight. In other cases, the layer is combined with resin and then multiple layers are laminated together under pressure and elevated temperature so the layers are bonded to each other to form a monolithic structure that is a rigid article. Often, the rigid layers and articles would use more resin than the flexible layers and articles. Either the flexible or rigid article can be used in a garment by inserting the articles in pockets in the garment, where the pockets are located in strategic areas of the body of the wearer to protect vital organs. Alternatively, the flexible articles can be sewn or otherwise formed into the garment directly.

High strength yarns useful in such a penetration resistant fabric would preferably have a tenacity of at least 8 g/d, a tensile modulus of at least 150 g/d, and an energy to break of at least 10 j/g. More preferably, the tenacity is at least 20 g/d, the tensile modulus is at least 500 g/d, and the energy to break is at least 30 j/g. The denier of the fiber may vary and is typically less than 4000 and is preferably from about 10 to 1000. Useful inorganic fibers include S-glass fibers, E-glass fibers, carbon fibers, boron fibers, alumina fibers, zirconia-silica fibers, alumina-silica fibers and the like. Useful organic fibers are those composed of thermosetting polymers, thermoplastic polymers and mixtures thereof such as polyesters, polyolefins, polyetheramides, fluoropolymers, polyethers, celluloses, and others, such as liquid crystalline polymers, PBO (poly 1,4-phenylene-2,6-benzobisoxazole), and AB-PBI (poly 2,5[61-benzimidazole). Particularly useful fibers are those composed of aramids, (such as poly (p-phenylene terephthalamide) and poly (m-phenylene isophthalamide) polyamides (such as nylon 6, nylon 6,6), high molecular weight polyethylene, high molecular weight polypropylene, and high molecular weight polyacrylonitrile.

Some arrangements of yarns and resin in a film form to make a penetration resistant fabric layer are shown schematically in FIGS. 13A, 13B, 13C, and 13D. These figures are viewed along the section line 14—14 in FIG. 4E to look at the arrangement of the odd numbered subgroups in the 90 degree direction of the group II yarns, which also represent the arrangement of the even numbered zero degree yarns; these yarns are omitted for clarity. Portions of adjacent cells are shown to observe the cell-to-cell relationships. The numbers of yarns and the actual arrangement in FIGS. 13A–D differ somewhat from FIG. 4E, however.

Figure 13A:
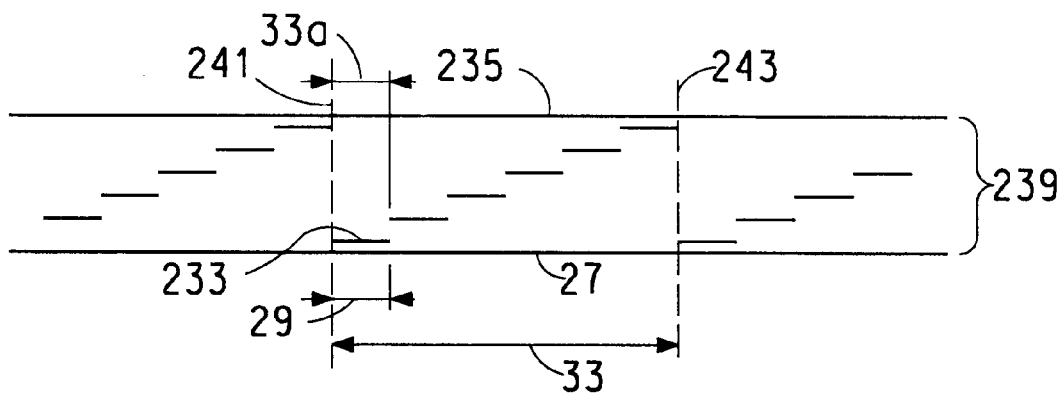
FIGS. 13A–13D are schematic section views of different ways of laying down yarn subgroups to make penetration resistant fabrics including resin webs.

FIG. 13A shows six ninety degree yarns, such as yarn 233, that are stacked abutted with no overlap and with a film group 235 on the top and a film group 237 on the bottom of the fabric subgroups. Dashed lines 241 and 243 identify the cell edges referenced off the bottom yarns for a cell distance 33. When stacked abutted, the yarn offset distance 33a is about equal to the yarn width 29. Having film 235 and 237 on the top and bottom, respectively, provides a robust layer structure 239 suitable for making a flexible penetration resistant article from a plurality of loosely attached layers. one film, such as film 235 may be sufficient to stabilize the yarns in layer 239 for careful handling. This may be adequate if it is desired to stack layer 239 with other such layers placed with the film side of one layer against the non-film side of an adjacent layer to form a rigid, thermally laminated, penetration resistant article. In this case, the film side of one layer will act to stabilize the non-film side of the adjacent layer so the final article will be a robust composite structure. The bottom of the article would have a non-film side facing outward and would have to have one film sheet placed on that surface to complete the article.

Figure 13B:
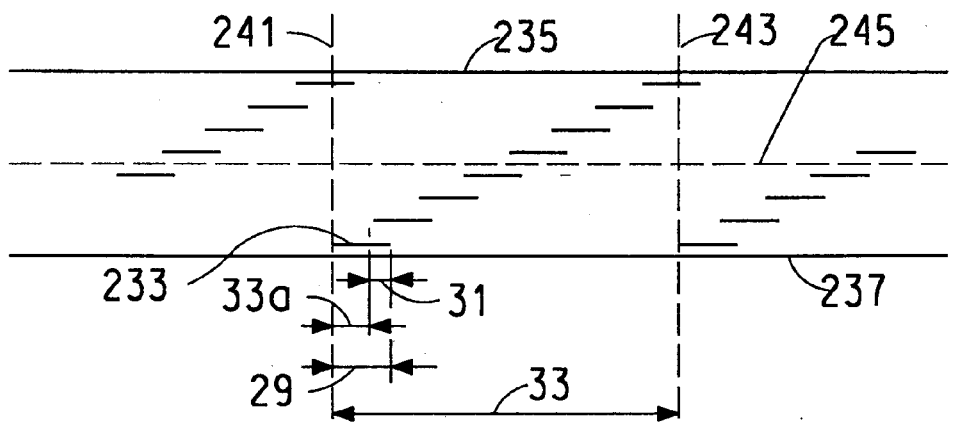

FIG. 13B shows eight ninety degree yarns 233 in the same cell distance 33 as in FIG. 13A that results in overlap between sequential subgroups of a group. The film is again shown on the top at film group 235 and bottom at film group 237. Additionally, another film group 245 (shown in dashed lines) could be advantageously placed between the middle subgroups to improve layer integrity. When stacked overlapped, the yarn offset distance 33a is less than the yarn width 29 to form an overlap distance 31.

Figure 13C:
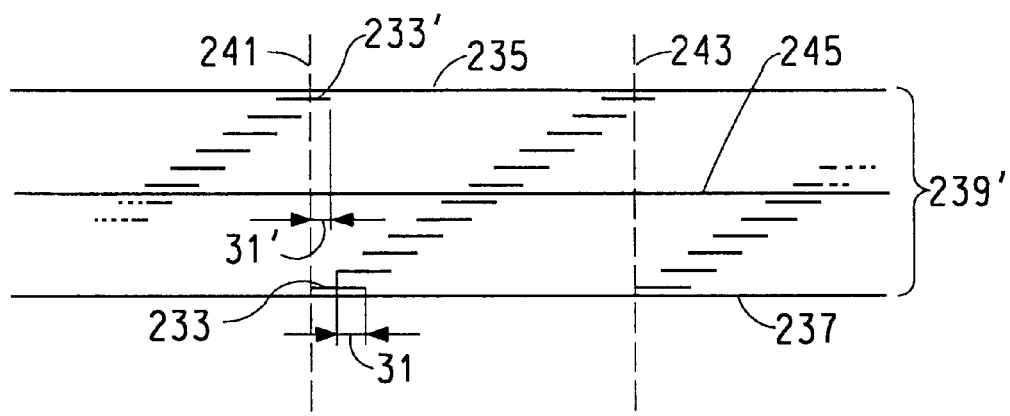

FIG. 13C shows twelve ninety degree yarns, twice as many yarns in the cell as in FIG. 14A. This produces an overlap 31 that is greater than that shown in FIG. 13B. In this case a film group 237 between the middle subgroups is preferred to achieve a good resin-to-fiber ratio and to position more resin near the central subgroups that are further from the top and bottom films 235 and 237, respectively, of the fabric layer 239'. An overlap 31 also exists between the bottom yarn 233 of one cell with the top yarn 233' of the adjacent cell (also the condition in FIG. 13B).

Figure 13D:
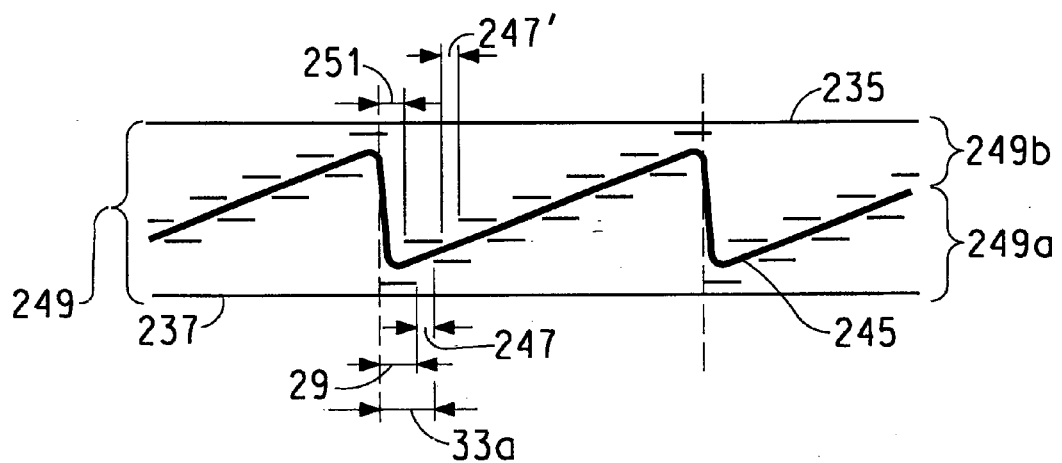

FIG. 13D shows an alternate arrangement of the large number of subgroups of FIG. 14C illustrated with narrower yarns in the same cell distance 33. In this case, the subgroups are first arranged on a film group 237 without any overlap and with a gap 247 where the step or offset distance 33a is greater than the yarn width 29. This forms a semi-completed cell 249a that covers the area, but with holes in the structure. It is not a completed cell in this configuration, since it is not stabilized at this point in the construction. Directly on top of that just formed semi-complete cell 249a, a film 245 is laid down and another semi-complete cell 249b is formed. The start point for the first subgroup of each group of the second semi-complete cell 249b is displaced from the start point of the first semi-complete cell 249a by a distance 251 so the yarn width of the second semi-complete cell 249b covers the gap in the first semi-complete cell 249a. The second semi-complete cell is completed with a gap 247' between adjacent yarns which is aligned to be covered by the yarns in the first semi-complete cell. A film 235 is placed over the top of the completed cell 249. Although the middle film 245 is illustrated in this schematic having a zig-zag path, when the fabric is stabilized with an ultrasonic horn, or the like, and consolidated in a heated press, the middle film will be essentially parallel to the top and bottom films.

It has been found that the pattern of yarns illustrated in FIGS. 1E/2A and 4C provide particularly good interlacing of yarns so the structures tend to hold their shapes better without yarns shifting and holes opening up in the fabric. There are some significant differences in the two yarn laydown patterns, however. The simple cell of FIGS. 1E/2A utilizes more feed yarns per inch of fabric than the split cell of FIG. 4C, and if the practice of providing at least one bond per cell is followed, more bonds would be used per area of fabric. The use of more feed yarns may require a larger yarn creel and more yarn guides as will be appreciated when various apparatuses will be discussed below. This use of more feed yarn per inch, however, results in more rapid fabric development using the simple cell pattern. The split cell pattern, on the other hand, provides the same good interlacing of yarns as the simple cell pattern and offers more flexibility in forming different yarn structures with any given apparatus at the tradeoff of fabric forming time.

In general terms, the fabric structure of the invention is an interlaced fabric structure comprising:

a plurality of first yarn subgroups having a plurality of yarns oriented in a first angular direction free of crossings, the first yarn subgroups forming a stack with a plurality of second yarn subgroups having a plurality of yarns oriented in a second angular direction free of crossings;

the yarns in each subgroup following substantially parallel paths that are spaced apart in a repeating pattern to sparsely cover a common predetermined fabric area;

the yarn subgroups are alternately stacked with a first subgroup next to a second subgroup, wherein the yarns in the first subgroup cross the yarns in the second subgroup;

the yarns in any one subgroup of the plurality of first subgroups are offset from the yarns in all other subgroups of the first plurality of subgroups;

the yarns in any one subgroup of the plurality of second subgroups are offset from the yarns in all other subgroups of the second plurality of subgroups;

the stacking of all of the plurality of first subgroups forming a first yarn group comprising yarns that densely cover the predetermined fabric area, and the stacking of all of the plurality of second subgroups forming a second yarn group comprising yarns that densely cover the predetermined fabric area; and the yarns in the top subgroup in the stack, are connected to the yarns in the bottom subgroup in the stack, to thereby contain the other subgroups in the stack in an interlaced fabric structure.

In the case of the simple cell, single step pattern, the interlaced fabric structure also includes:

the yarns in successive ones of the plurality of first subgroups in the stack are offset from each other by the width of a yarn in that subgroup of the fabric; and the yarns in successive ones of the plurality of second subgroups in the stack are offset from each other by the width of a yarn in that subgroup of the fabric.

In the case of a penetration resistant simple cell, single step pattern, the interlaced fabric structure also includes:

the yarns in successive ones of the plurality of first subgroups in the stack are offset from each other by less than the width of a yarn in that subgroup of the fabric; and the yarns in successive ones of the plurality of second subgroups in the stack are offset from each other by less than the width of a yarn in that subgroup of the fabric;

whereby the yarns in the successive first subgroups overlap one another and the yarns in the successive second subgroups overlap one another.

The connection means for fabrics of the invention may be by ultrasonic bonding (as discussed) or a heated tool if the yarns are a thermoplastic polymer and the top and bottom yarns are compatible polymers that will bond together by fusion. The connection (or bonding) means may also be a hot melt adhesive, a solvent that softens the yarn polymer and permits the yarns to fuse together, a room temperature curing adhesive, a solvent ased adhesive or other impregnating type, a mechanical fastener such as a staple, strap, or tie, or other such eans. Also useful for large area bonding are webs of thermoplastic or thermosetting polymer.

In the case of a bonded connection, all of the yarns in the structure do not need to be thermoplastic yarns to act as binder yarns to provide a source of resin for bonding. The binder yarns necessary to provide the sticky polymer, partially dissolved polymer, molten polymer, or the like to act as an adhesive, or binder, for the bond may be distributed throughout the structure in a variety of ways. A binder yarn is a yarn that would mechanically or adhesively engage another binder yarn or a non-binder yarn during bonding. A non-binder yarn is one that would not mechanically or adhesively engage another non-binder yarn during bonding. In a simple case, some or all of the yarns for the structure can be made from non-binder fibers which are covered with binder fibers by twisting or wrapping, or covered with a polymer coating, such as by extrusion. An example of such a wrapped yarn is a yarn with a multifilament non-thermoplastic core, that acts as a structural component, which is wrapped with a multifilament sheath that contains some or all thermoplastic filaments. The sheath can be continuous filaments or staple fibers. In the case of staple fibers, the sheath can be a blend of binder and non-binder fibers, such as thermoplastic nylon staple fibers and non-thermoplastic aramid or cotton staple filaments. A blend of 5–25% by weight thermoplastic binder fibers in the sheath may work well for this application. other binder and non-binder polymers may be used for the fibers in the yarn as desired. When bonding using such a sheath/core yarn, it is to be expected that the sheath filaments would be affected by the bonding process while the core filaments would not. The core filaments could be relied on to carry the load in the structure after bonding. In some cases, it may be desirable to form bonds at all yarn crossings to form a stiff board-like fabric structure. This may be accomplished by heating and urging together all the binder fiber in the structure so essentially all the yarns are bonded together.

Another way to distribute binder adhesive material to bond the structure together is to provide binder yarn for one or more upper subgroups of, for instance, the zero degree group of yarns; and for one or more bottom subgroups of, for instance, the ninety degree group of yarns. Alternatively, the upper subgroups and bottom subgroups may comprise binder yarns from the zero and ninety degree groups of yarns. These top and bottom yarns may be the sheath/core yarns described above. Another way to distribute binder material is to use a binder containing yarn for some fraction of each subgroup of, for instance, zero and ninety degree yarns, such as every other or every tenth yarn in each subgroup. One structure that has been found to work well is to make the top and next subgroups of yarns and the bottom and next subgroups of yarns with binder fibers. During bonding, the top and next sublayer, and bottom and next sublayer, binder yarns are adhesively joined and other non-binder yarns may be mechanically engaged, such as by embedding, enveloping, tacking, or the like. This additional engagement of non-binder fibers results in load paths extending from the top to the bottom subgroups of yarn even where the top and bottom subgroups don't directly contact each other.

When using a distribution of binder resin and fiber in the structure of the invention, it has been found that a distribution of about 5%–60% binder resin by total fabric weight is useful, and preferably a distribution of about 10%–20% by total fabric weight works well to provide good fabric integrity while retaining good fabric softness (minimize fabric stiffness and boardiness). The binder resin may be introduced into the structure in a variety of ways. For instance it may be in the form of a yarn, a web (including film, spunbonded or spunlaced sheets with or without reinforcement), slit film strips, a polymeric powder, a spray adhesive that forms a web (swirl spray), slit or perforated polymer sheets, a network of polymeric fibers and the like. In cases where fabric softness is not required, the bonding resin may be provided by a polymeric web group that may comprise fibers or a film applied to at least one of the top or bottom surfaces of the fabric. Preferably, the web is provided on the top and bottom surfaces, and most preferably, the web is provided on the top and bottom surfaces and at one of the intermediate subgroup surfaces between the top and bottom subgroup surfaces. The polymeric web may be a continuous or discontinuous surface comprised of one or more polymeric materials which may optionally contain one of more additional components as for example one or more particulate or fibrous filler materials or which may optionally contain one or more rigid components provided that the web has the required flexibility. The polymeric materials for either the web or binder yarn may include thermoplastic resins, thermosetting resins, and a combination thereof. Such resins for the web group may be in the form of a single sheet or a plurality of strips. Such resins and sheet forms are disclosed in U.S. Pat. No. 5,677,029 to Prevosek, et al, which is hereby incorporated herein by reference. Preferred polymeric materials for binder resin are thermoplastic materials such as polyolefins, polyamides, and polyesters. Most preferred polymeric materials are polyolefins such as polyethylene, polypropylene, and the like, and polyamides, such as nylon 6 and nylon 6,6.

In some cases, it may be desirable to have an all thermoplastic yarn structure that serves as both binder yarn and structural yarn, and control the bonds to be predominantly at some or all of the intersections between the top and bottom subgroups of yarns in the structure without having to carefully locate the intersections between these two subgroups. When using ultrasonics, for instance, to provide bonding energy to thermoplastic yarns, it may be possible to achieve this preferential bonding by using thick or "fat" yarns for the top and bottom subgroups of yarns. When squeezed between a broad-faced ultrasonic horn and anvil, the intersection of the fat yarns will receive more squeezing pressure than the adjacent thinner yarns so the ultrasonic heating will occur preferentially at the fat yarn intersections with minimum bonding of the thinner yarn intersections.

The connected fabric structure needs to have a controlled number of connections to achieve adequate strength, control bulk of the fabric, and to retain the inherent flexibility of the yarns used in the fabric. In the case of a penetration resistant fabric, however, bulk and flexibility may be compromised to prevent yarn shifting which cannot be tolerated. Too few connections and fabric integrity is compromised; too many connections and the fabric flexibility is compromised and bulk is reduced. The number of connections can be some fraction of the total number of yarn crossings in the structure. For good integrity, bulk control, and good flexibility, the number of connections must be controlled within limits.

Below is a table of variables and values for determining the fraction of bonded crossing to total crossings for a bulky, supple fabric. "N" represents the number of yarns per direction in a square unit cell; in the unit cell 380 this number is 8. "Min" is the bonding fraction if only one crossing is bonded out of N2 total crossings; "Med" is the bonding fraction if a single-crossing-width bond path is used that bonds N crossings out of N2 crossings; "Hi" is the bonding fraction if a double-crossing-width bond path is used that bonds N+(N−1) crossings out of N2 crossings; "V Hi" is the bonding fraction if a triple-crossing-width bond path is used that bonds N+(N−1)+(N−1) crossings out of N2 crossings.

| BONDING FRACTION TABLE | | | | |
| --- | --- | --- | --- | --- |
|  | Min | Med | Hi | V Hi |
| # Bonded Crossings = | 1 | N | N + (N − 1) | N + 2(N − 1) |
| Fraction of Bonded Crossing = | 1/N2 | 1/N | (2N − 1)/N2 | (3N − 2)/N2 |
| Comments N (# Yarns per direction in unit cell) | | | | |
|  | 3 | .111 | .333 | .556 | .778 |
| preferred | 4 | .063 | .250 | .438 | .625 |
| preferred | 5 | .040 | .200 | .360 | .520 |
| most preferred | 6 | .028 | .167 | .306 | .444 |
| most preferred | 7 | .020 | .143 | .265 | .388 |
| most preferred | 8 | .016 | .125 | .234 | .344 |
| most preferred | 9 | .012 | .111 | .210 | .309 |
| most preferred | 10 | .010 | .100 | .190 | .280 |
| preferred | 11 | .008 | .091 | .174 | .256 |
| preferred | 12 | .007 | .083 | .160 | .236 |
| preferred | 13 | .006 | .077 | .148 | .219 |
| preferred | 14 | .005 | .071 | .138 | .204 |
| preferred | 15 | .004 | .067 | .129 | .191 |
| preferred | 16 | .004 | .063 | .121 | .180 |
|  | 17 | .003 | .059 | .114 | .170 |
|  | 18 | .003 | .056 | .108 | .160 |

Overall, it has been discovered that a bonding fraction within the range of from about 0.003 to 0.778 is preferred. A bonding fraction within a range of about 0.008 to 0.520 is most preferred, or, that is, about 1% to 50% of the available crossings bonded or otherwise connected. This fraction can be controlled by the number of yarns in a cell and the number of bonds in a cell, which can be controlled by the width of the bond path and the number of bond paths within a cell. If there is more than one bond path within a cell, the bond paths should be narrow.

Figure 5A:
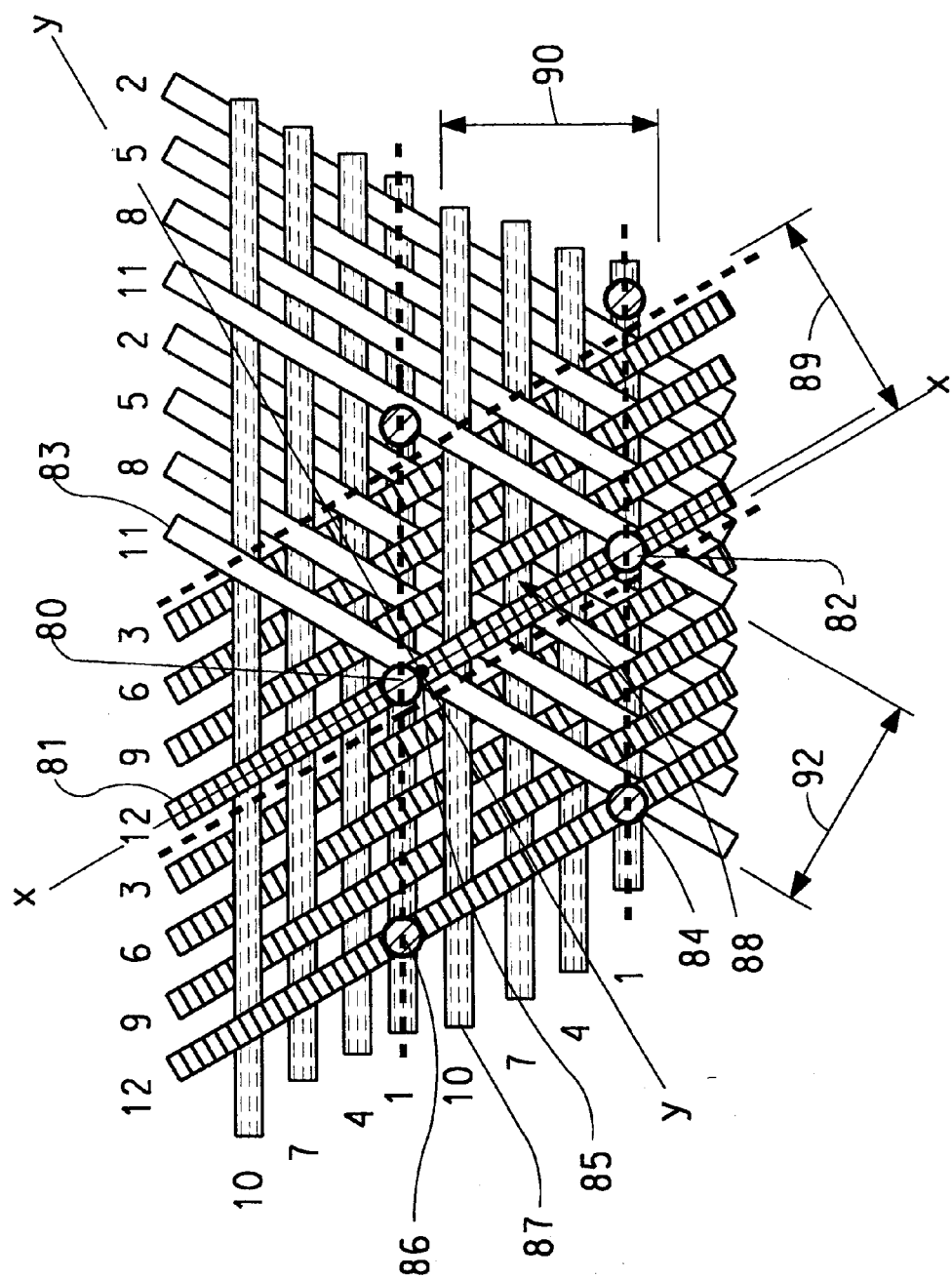
FIGS. 5A–B show two different plan views of a three layer (three-directional or triaxial) flexible fabric or yarn structure.
Figure 5B:
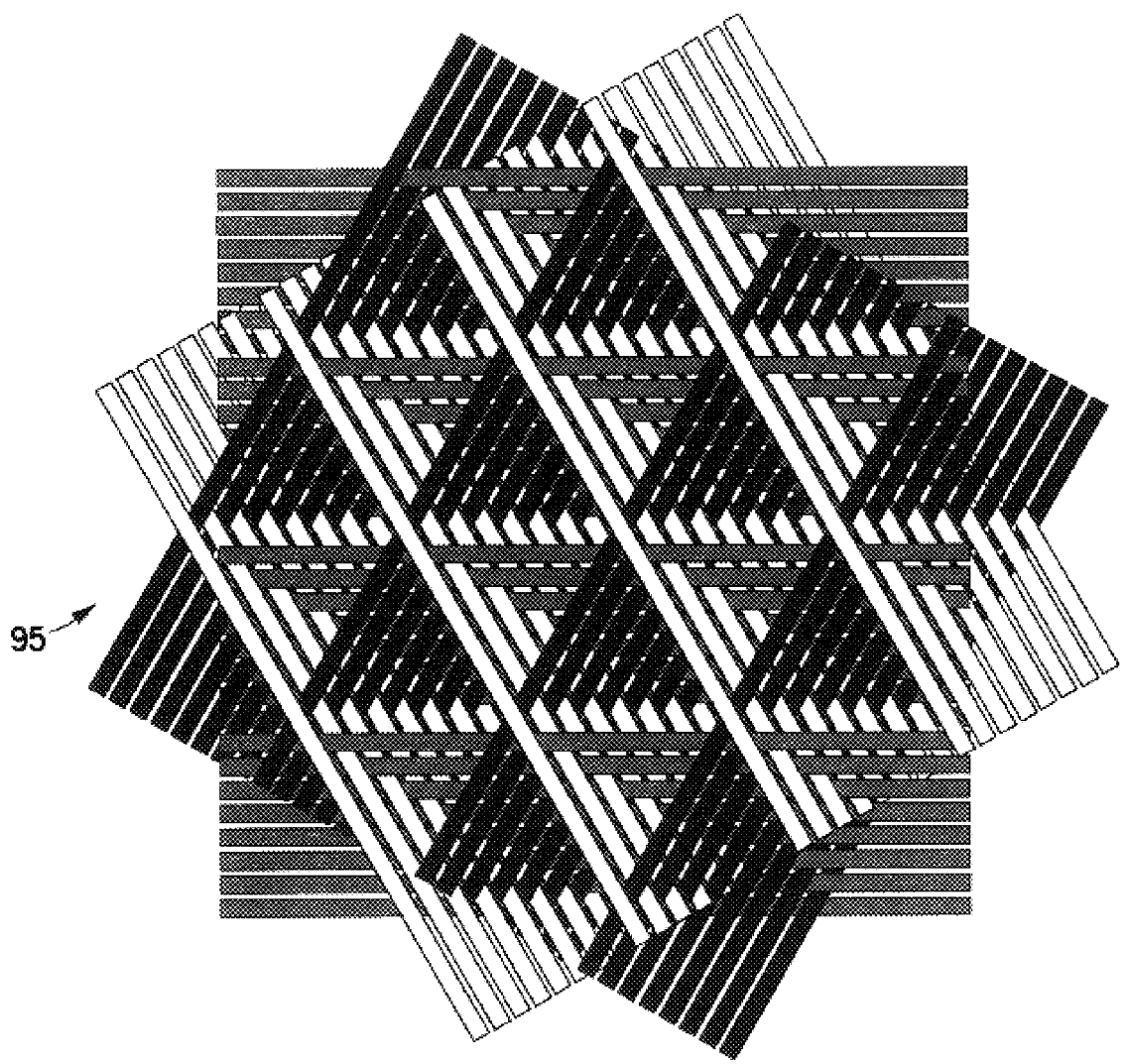

FIG. 5A shows another flexible fabric structure where the yarns are laid down in groups in three directions, at 0 degrees, 60 degrees and 120 degrees, to make a triaxial structure. For purpose of discussion, one parallelogram-shaped basic cell of the structure, that repeats throughout, is shown at 88 with sides shown by dashed lines which are oriented along the zero and sixty degree direction. Alternatively, the basic repeating cell could also have been selected as one with sides oriented along the zero and one hundred twenty degree direction. The top subgroup yarn 81 defines the location of the X-axis and the intersection of yarn 81 with the next subgroup yarn 83 defines the origin 85 and thereby the Y-axis. The cell space for the zero degree group is shown at 89; the cell space for the sixty degree group is shown at 90; The cell space for the one hundred twenty degree group is shown at 92. Each cell space has four possible positions for yarn in the subgroups. The third subgroup yarn 87 crosses the X-axis at about 0.5/4 which defines the third group shift from the origin. The top and bottom yarn subgroups, 12 and 1 respectively, are joined where they cross and overlap at points 80 and 82 both of which fall at the edge of the cell. Other overlap bond points in the structure, when developed into a larger area fabric, would be at the cross-hatched points, such as 84 and 86. Notice that the subgroup 2 yarns lay between the yarns of the top subgroup 12 and bottom subgroup 1 yarns and are at least partially involved in the bond. FIG. 5B shows a larger piece 95 of similar triaxial fabric, but made using eight yarns in each cell space, multiple cells, and a third group shift from the origin equal to zero, so equilateral triangles are formed by yarns of the three groups.

In general terms, the triaxial structure of the invention is similar to a biaxial structure of the invention with the addition that the interlaced fabric structure further comprises:

a plurality of third yarn subgroups having a plurality of yarns oriented in a third angular direction free of crossings, the third yarn subgroups forming a stack with the first and second yarn subgroups wherein the yarns in the third yarn subgroup cross the yarns in the first and second subgroups;

the stacking of all of the plurality of third subgroups forming a third yarn group comprising yarns that densely cover the predetermined fabric area.

Figure 6:
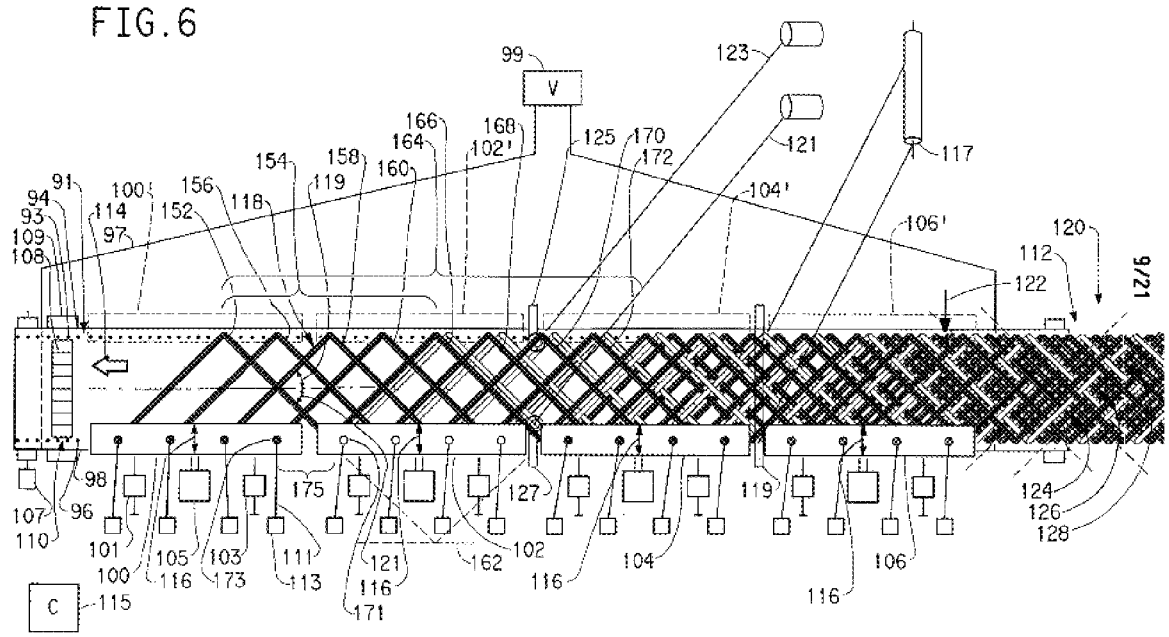
FIG. 6 shows an apparatus for continuously forming a two dimensional biaxial yarn fabric with the yarns oriented at an acute angle to the machine direction, and a fabric or yarn structure thus formed.

In FIG. 6, is shown an apparatus for continuously forming a biaxial fabric structure with basic cells similar to those of FIGS. 1E and 2A. The apparatus consists of an elongated yarn support surface, such as a flat perforated belt 91, driven by motor 107, having an array of pins, such as pin 93, along one edge 94 and a parallel array of pins, such as pin 96 along the opposite edge 98 of belt 91 for positively holding yarns against the forces of yarn reversal. Beneath the belt is arranged a vacuum plenum 97 attached to a source of vacuum 99 for holding the yarn in place on belt 91. Shown along edge 98 are a plurality of yarn guide blocks 100, 102, 104, and 106 that are each mounted on guide means, such as guides 101 and 103, and each having drive means, such as actuator 105 for block 100, for traversing across belt 91 from one edge 98 to an opposed edge 94. Each yarn guide block has a plurality of yarn guides, such as guide 173 in block 100, for guiding a yarn accurately onto the belt, such as yarn 111 coming off of yarn supply package 113. Dashed outlines 100', 102', 104' and 106' at edge 94 show the position the blocks would take after traversing belt 91. A plurality of ultrasonic horns, such as horn 108, at location 110 are positioned across the belt 91 to act on yarn laid thereon to fusion bond the overlapping yarns to one another at spaced positions in a deposited fabric. The belt and a rigid support 109 underneath act as the ultrasonic anvil to couple the energy through the yarn. As soon as the yarn cools from the ultrasonic bonding, the fabric structure can be stripped off the pins or hooks along the edge of the belt and the belt can be recirculated while the fabric is wound in a roll on a core (not shown). The winding tension for the fabric would be controlled to avoid distortion of the fabric along the direction of the belt which is along the fabric diagonal (bias) and along the axis of the bond path.

A representation of a two-group, biaxial, deposited fabric 112 is shown on the belt. The representation shows the pattern of yarn laid down as the process starts up and the belt moves from right to left in the direction of arrow 114 as the blocks move substantially perpendicularly across the belt together from edge 98 to edge 94 in a manner coordinated with the belt motion along the belt elongated axis; and continue back and forth as represented by arrows 116. What is shown is what was produced at start-up and then was stopped and the belt backed up to align the start pattern with the guide blocks. For a true representation, block 100 (and the other blocks) would be shown shifted to the right in the figure to a location just beyond block 106. At the left end 118 of fabric 112 the top subgroups of yarn are laid down by themselves, since at start-up none of the other subgroups are in place yet. At the right end 120 of the fabric 112, all subgroups are in place for a fully formed fabric by position 122 and the fabric will thereafter be continuously fully formed as the belt and blocks continue moving as described. The speed of the belt and the speed of the blocks are controlled and coordinated by a controller 115 communicating with motor 107 and the actuator for each block, such as actuator 105. This ensures that the yarn passing through the guide blocks and laying on the belt forms a straight path at a 45 degree angle with the centerline and edge of the belt so there is a first group of yarn at +45 degrees as at 119 and a second group of yarn at −45 degrees as at 121. By varying the controlled motions, other angles of laydown and curved paths are also possible. The first and second (lower) subgroups of yarn are laid down by block 106, the third and fourth (middle) subgroups of yarn are laid down by block 104, the fifth and sixth (middle) subgroups of yarn are laid down by block 102, and the seventh and eighth (upper) subgroups of yarn are laid down by block 100. A given yarn across the fabric may alternate between subgroups in the cells going back and forth across the fabric. In this example, the belt is moving and the blocks move only back and forth across the belt and the belt moves continuously from right to left. The same pattern can be generated if the belt is considered stationary and unusually long, and the blocks move back and forth diagonally at 45 degrees along the belt from left to right.

Figure 7:
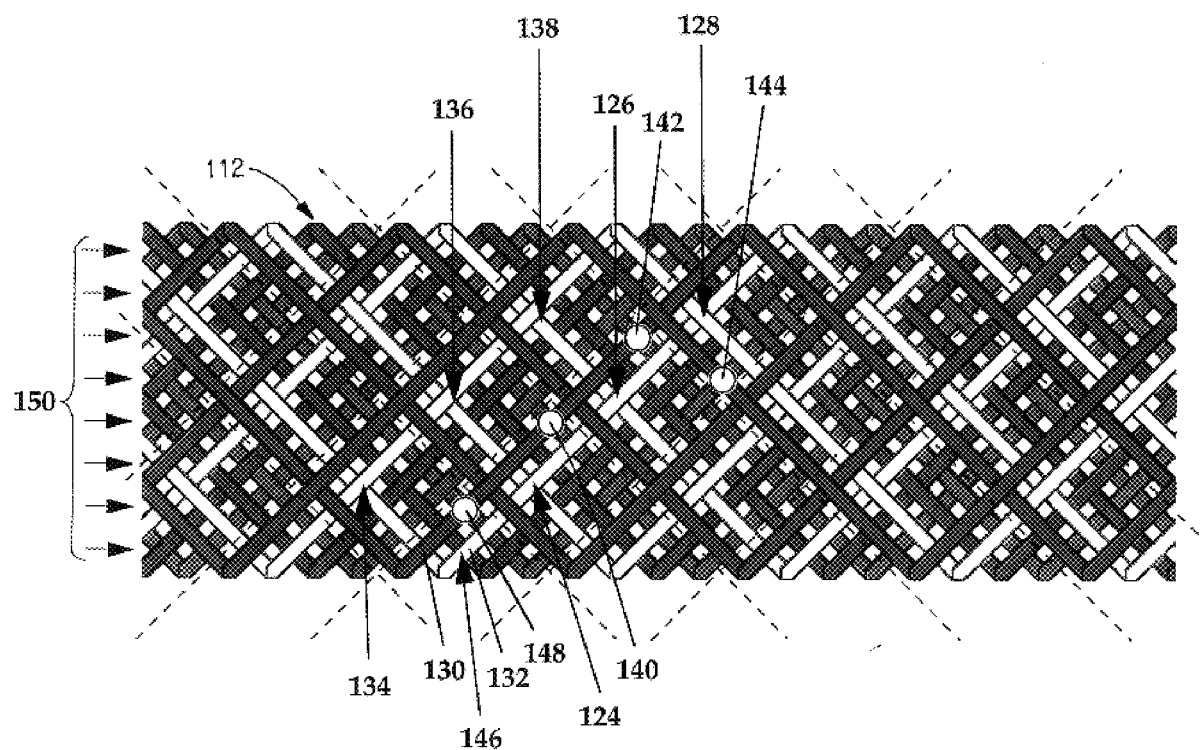
FIG. 7 is an enlarged view of a portion of the fabric of FIG. 6.

The pattern of over and under yarns varies in the fabric as evidenced by cells 124, 126, and 128. FIG. 7 shows this portion of fabric 112 enlarged for discussion. The yarns are shown slightly spaced apart in each group for clarity. In FIG. 7, yarn 130 is the eighth subgroup top yarn in cells 124 and 126, but is the seventh subgroup yarn in cell 128. Likewise, yarn 132 is the sixth subgroup yarn in cells 124 and 126, but the fifth subgroup yarn in cell 128. Similar changes occur in the remaining subgroups. This deviation from a perfectly regular pattern within a fabric, unlike the pattern in FIGS. 1E and 2A, does not affect the structural integrity of the fabric and is an example of some acceptable variations in the patterns of the invention. The adjacent cells 134, 136, and 138 are all identical and are the same as the cells of FIGS. 1E and 2A. Each yarn has a subgroup assignment and a position assignment in a cell. However, both the subgroup assignment and position assignment may vary from cell to cell in a given fabric structure, or they may remain constant, and in both cases still follow the basic rules for practicing the invention which are:

a plurality of substantially parallel yarns in a group are arranged to densely cover an area with the yarns of one group arranged to cross the yarns of another group;

each group is comprised of a plurality of subgroups, with each subgroup having a plurality of yarns sparsely arranged;—the plurality of yarns in one subgroup of one group are offset from the plurality of yarns in the other subgroups of the same group;

the yarns of the top subgroup and bottom subgroup are connected to each other at spaced locations either directly, or indirectly through the yarns in the other subgroups.

The top to bottom bond point for cell 124 is at 140; the bond point for cell 126 is at 142; the bond point for cell 128 is at 144. For a partial cell 146 at the edge of the fabric, the bond point is at 148. All these bond points would be covered by ultrasonic paths aligned with the arrows 150 at the left end of FIG. 7.

Four yarns in each guide are sufficient to cover the belt for a four-yarn-cell-space fabric at the width shown and for a 45 degree pattern. In FIG. 6, the space covered by one yarn, such as yarn 152, going from belt side 94 over to belt side 98 and back across the belt 91 takes up a distance along the belt as shown at 154. Four yarns, such as yarns 152, 156, 158, and 160 in guide 100, fill this space for subgroups 8 and 7. If a wider belt were used where the opposite edge 98 was at 162, the space covered by yarn 152 going back and forth across belt 91 would take up a distance along the belt as shown at 164. This would require additional yarns 166, 168, 170, and 172 to fill this space for subgroups 7 and 8. Guide 100 would have to be extended to hold 8 yarns instead of only 4 for this wider fabric, and block 102 would have to be shifted along the length of the belt 91 to make room for the larger block 100. Block 102 and the other blocks 104 and 106 would be extended and shifted similarly. The first yarn guide hole 171 in block 102 is shown spaced from the last yarn guide hole 173 in block 100 by a distance 175 of one cell diagonal plus one yarn position diagonal to lay down the subgroup 5 and 6 yarns in offset positions from the subgroup 7 and 8 yarns laid bown by block 100. This spacing is similar for the succeeding guide blocks along the side of belt 91. This spacing may be less or more by units of a cell diagonal depending on how much room is needed for the guide blocks.

This spacing of guide blocks and coordinated motion between the blocks and the belt results in the 45 degree diagonal pattern of yarn wherein the positions of each of the diagonal yarns are adjacent the other yarns (rather than overlapping them) to thereby densely cover the yarn support surface on the belt with the yarns. If a more dense, thicker structure is desired, additional guide blocks may be employed and another dense structure built up on top of the first one to make a layered structure.

With the arrangement shown with separate guide blocks, the position of subgroup yarns in the cell space can be varied by displacing the blocks along the length of the belt 91. With a space between the guide blocks and the manner of laying down yarns to form a fabric, it is possible to add materials between the subgroups of yarns within a fabric structure. For instance, a roll of film 117 could be arranged to continuously feed film between blocks 104 and 106, around a guide 119, and onto the fabric 112 between the subgroups of yarn laid down by block 106 (subgroups 1 and 2) and block 104 (subgroups 3 and 4). In another instance, machine direction yarns 121 and 123 could be arranged to continuously feed yarn between blocks 102 and 104, through guides 125 and 127 respectively, and onto the fabric 112 between the subgroups of yarn laid down by block 104 (subgroups 3 and 4) and block 102 (subgroups 5 and 6). Such insertions of material between subgroups is a unique capability of the fabric of the invention. In the case illustrated, the addition of the film and machine direction yarns can reduce the deflection of the bias fabric in the machine direction or can achieve other special purposes. other materials, such as nonwoven fabrics, wires, elastomeric fabrics or yarns, webs of natural or synthetic materials, scrims, etc., can be inserted.

Figure 9:
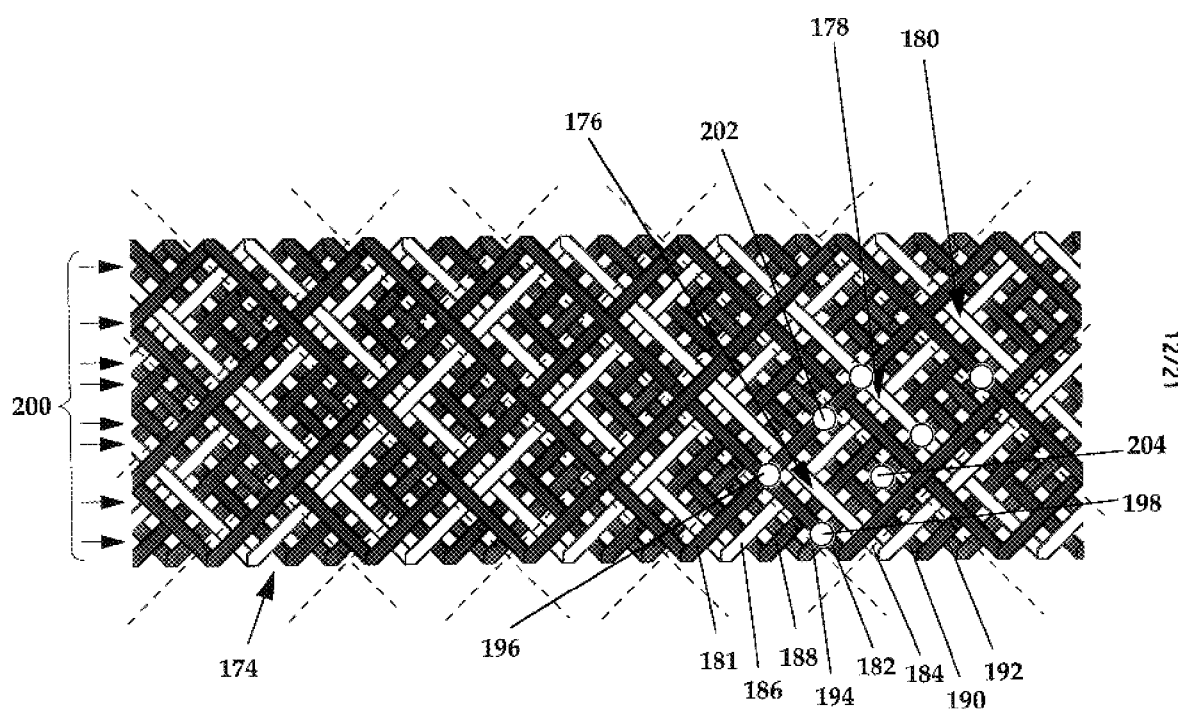
FIG. 9 is an enlarged view of a portion of a fabric formed by the apparatus of FIG. 8.

There is another way of using guide blocks to lay yarn down continuously to form a fabric on a belt. The blocks could be arranged in alternate locations along the edge of belt 91 and be arranged to travel in opposite directions across the belt as the belt is moving as shown in FIGS. 8A and 8B. In FIG. 8A, the blocks 100 and 104 are arranged along edge 94 of belt 91 and blocks 102 and 106 are arranged along edge 98. As the belt 91 moves from right to left as seen going from FIGS. 8A to 8B, the blocks cross the belt to the opposite side, thereby laying yarn down on the belt in a diagonal path. Repeated operation of the blocks back and forth as the belt continues to run will produce a pattern such as seen in enlarged fabric 174 of FIG. 9. This pattern is slightly different from the fabric 112 of FIGS. 6 and 7. Looking at cells 176, 178, and 180, cells 176 and 178 are five subgroup cells while cell 180 is an eight subgroup cell. In cell 176, yarn 181 is in subgroup 5; yarns 182 and 184 are in the same subgroup, subgroup 4; yarns 186 and 188 are both in subgroup 3; yarns 190 and 192 are both in subgroup 2 and yarn 194 is in subgroup 1. Looking at cell 180, yarn 181 is in subgroup 7; yarn 186 is in subgroup 5; yarn 188 is in subgroup 3 and yarn 194 is in subgroup 1. Cell 180 has the same arrangement as the basic cell of FIGS. 1E and 2A. In order to form proper bond points from the top subgroup 5 to the non-intersecting bottom subgroup 1 in cell 176, there must be a bond point 196 between yarn 181 of group 5 and yarn 182 of group 4 plus a bond point 198 between yarn 182 and yarn 194 of group 1. With the ultrasonic bonding paths as shown by the arrows at 200, there will be an additional bond point 202 between yarn 181 of subgroup 5 and yarn 192 of subgroup 2 and a bond point 204 between yarn 192 and yarn 194 of subgroup 1. Through a chain of bond points in cell 176, the top subgroup 5 is connected to the bottom subgroup 1 even though the top and bottom subgroups don't cross one another. The arrangement of ultrasonic bond paths to achieve proper spaced bonds for the fabric 112 of FIGS. 6 and 7 is different from the bond paths for the fabric 174 of FIG. 9.

Figure 10A:
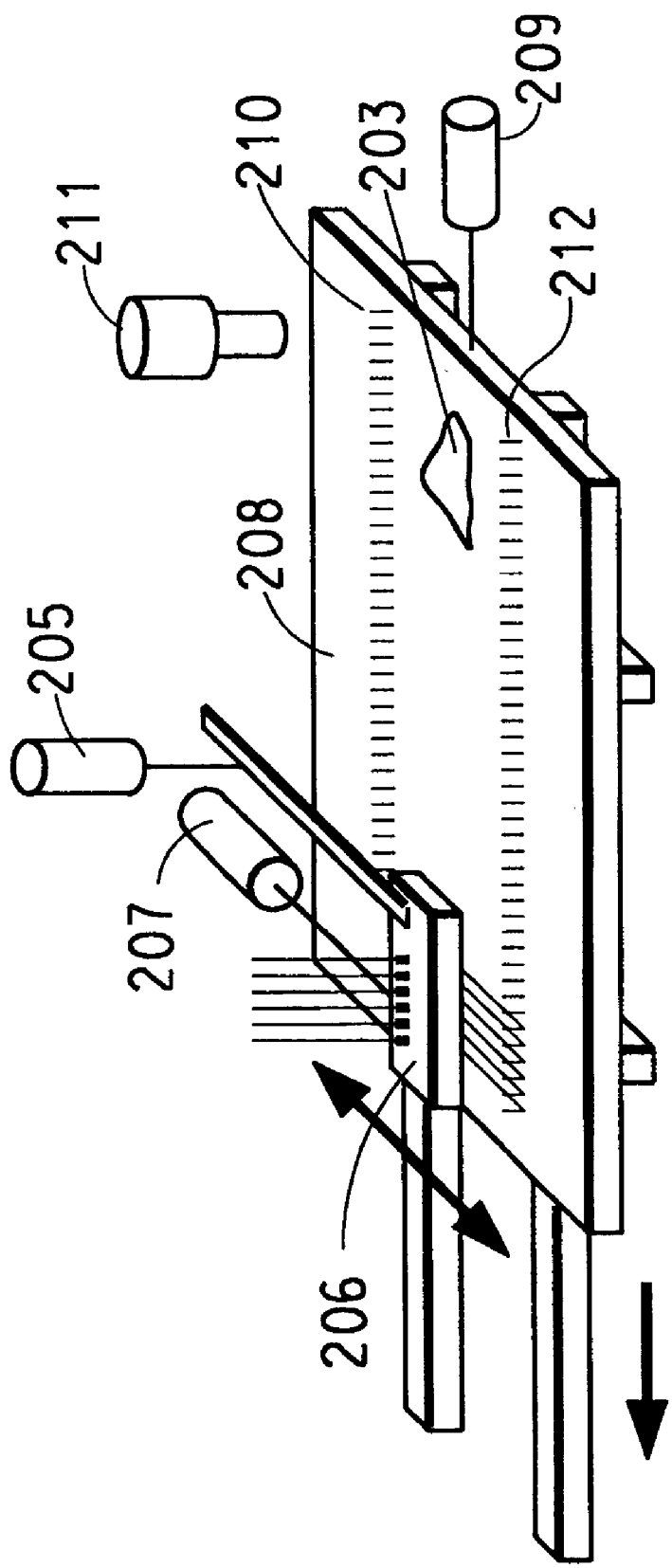
FIGS. 10A–B show a table apparatus for making a single batch of two dimensional or three dimensional fabric structure and a sample of a piece of three dimensional biaxial fabric structure.
Figure 10B:
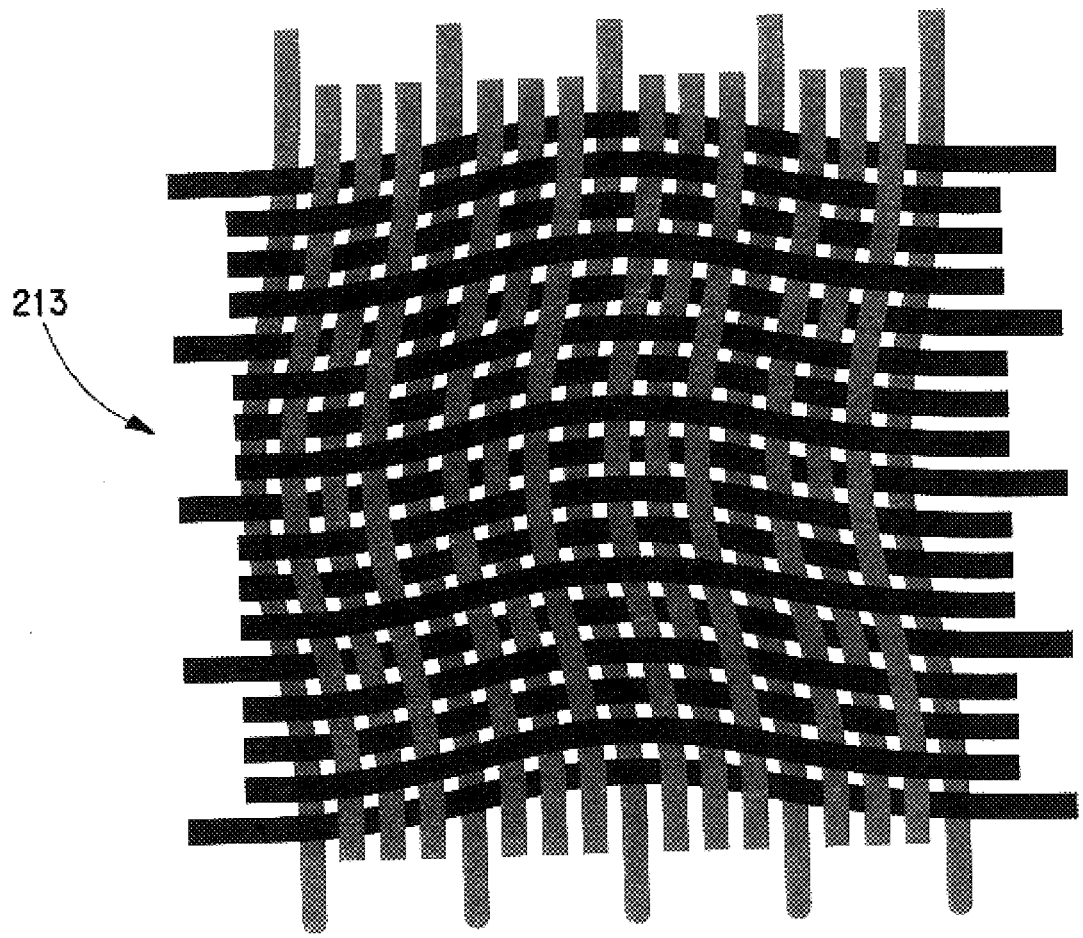

FIG. 10A shows another apparatus for producing two dimensional fabrics of the invention. It is suitable for making a batch fabric instead of a continuous fabric. It is a simpler apparatus than that of FIG. 6. A single guide block 206 is oscillated back and forth by actuator 207 over a table 208 that also oscillates back and forth by actuator 209 in a direction at right angles to the direction of oscillation of block 206. Parallel rows of pins 210 and 212 hold the yarn at the reversals. Vacuum may also be applied to the plate if desired. The block and table make numerous cycles back and forth in a manner coordinated with each other to produce dense groups of yarn crossing one another. A single ultrasonic bonding horn 211 is then repeatedly passed over the fabric in paths parallel to the oscillation direction of table 208 to make spaced bond paths to connect the top and bottom subgroups of yarns together. The fabric is then peeled off the edge pins 210, 212. By adding motion to the guide 206 in a vertical direction by actuator 205, a three dimensional fabric could be made over a three dimensional form 203 mounted on table 208. FIG. 10B shows the curved yarn paths in a fabric 213 that may be employed to cover a three dimensional form.

FIG. 11A shows another apparatus for producing two dimensional batches of fabric structure. It is similar to the apparatus of FIG. 10 except instead of laying yarn down on a table, the yarn is placed on a mandrel 214 by a guide block 216. Instead of the guide block 216 oscillating back and forth as in FIG. 10, the guide block 216 is stationary and the mandrel 214 oscillates in a rotary motion by motor 215 as indicated by arrow 217 at the same time the table 208' moves the mandrel past the guide block by actuator 209'. A single row of pins 218 holds the yarn between reversals in both directions as the mandrel rotates. The result is a fabric having a cylindrical tubular shape during fabrication. After all yarns are laid down, a single ultrasonic horn 219 repeatedly follows an axial path along the mandrel at different circumferential locations over the fabric as it is oscillated back and forth via the table and mandrel. This results in parallel bond paths to connect the top and bottom groups together. Alternatively, the horn could follow a circumferential path at different axial locations along the mandrel. When peeled off pins 218, the result is a flat fabric. This fabrication on a cylindrical mandrel has an advantage over the flat plate of FIG. 10A in that yarn tension can be used to hold the yarns securely against the mandrel.

FIG. 11B shows an apparatus similar to that in FIG. 11A except the mandrel would rotate continuously in one direction 221 instead of oscillating to make a cylindrical batch of fabric. In FIG. 11B, a rotating mandrel 220 is mounted on moveable table 208", oscillated by actuator 209". A circular yarn guide support 222 holds a plurality of guides, such as yarn guide 224, that are spaced apart around the circumference of the mandrel 220. Support 222 is held stationary relative to the mandrel and table. A yarn strand, such as strand 226 from stationary package 228, is fed through each guide, such as 224, and is secured to end 230 of the mandrel where the support and mandrel are aligned before the mandrel starts to rotate and the table starts to move. Since the yarn packages are stationary, endlessly using a resupply package (not shown) and yarn transfer tails on the packages. The mandrel 220 has a plurality of rings 232 and 234 of closely spaced pins near the ends 230 and 236, respectively, of the mandrel as shown. These engage the yarn at the ends of the traverse when the table reverses direction. At the end of each traverse as the yarn engages the pin rings, the table stops moving and the mandrel is moved through a few degrees of rotation to make sure the yarn is firmly engaged by the pins before the table reverses direction. To firmly anchor the yarn in the pins of the pin ring, the ends 230 or 236 of the mandrel can be positioned just beyond the guide ring 222 and the mandrel rotated 90–360 degrees to wrap the yarn over the corner of the appropriate mandrel end. This orients the yarns in a radial direction as seen on end 230 and aids in accurate positioning of the yarns in the cell structure by minimizing yarn sliding around the circumference of the mandrel as the angular path of the yarn is started and stopped. The mandrel may be moved precisely by a stepping motor, such as motor 238. The yarn must also align with the desired offset position of the cell before laying down next to an adjacent yarn. For bonding the structure and stabilizing the yarn locations, an ultrasonic horn 219 and a hot plate 223 are positioned adjacent the mandrel 220. During bonding, the mandrel is withdrawn from guide ring 222 and is laterally positioned by actuator 225 that moves table 208" on slide 229 to bring the mandrel close to the selected bonding means. The bonding means are provided with their own actuators to press against the structure on the mandrel. In addition, the mandrel 220 can be provided with internal heating means (not shown) to heat the fabric from the mandrel side. A means of cooling the heated mandrel may also be provided to rapidly set the thermoplastic resin and speed up cycle times.

Figure 11C:
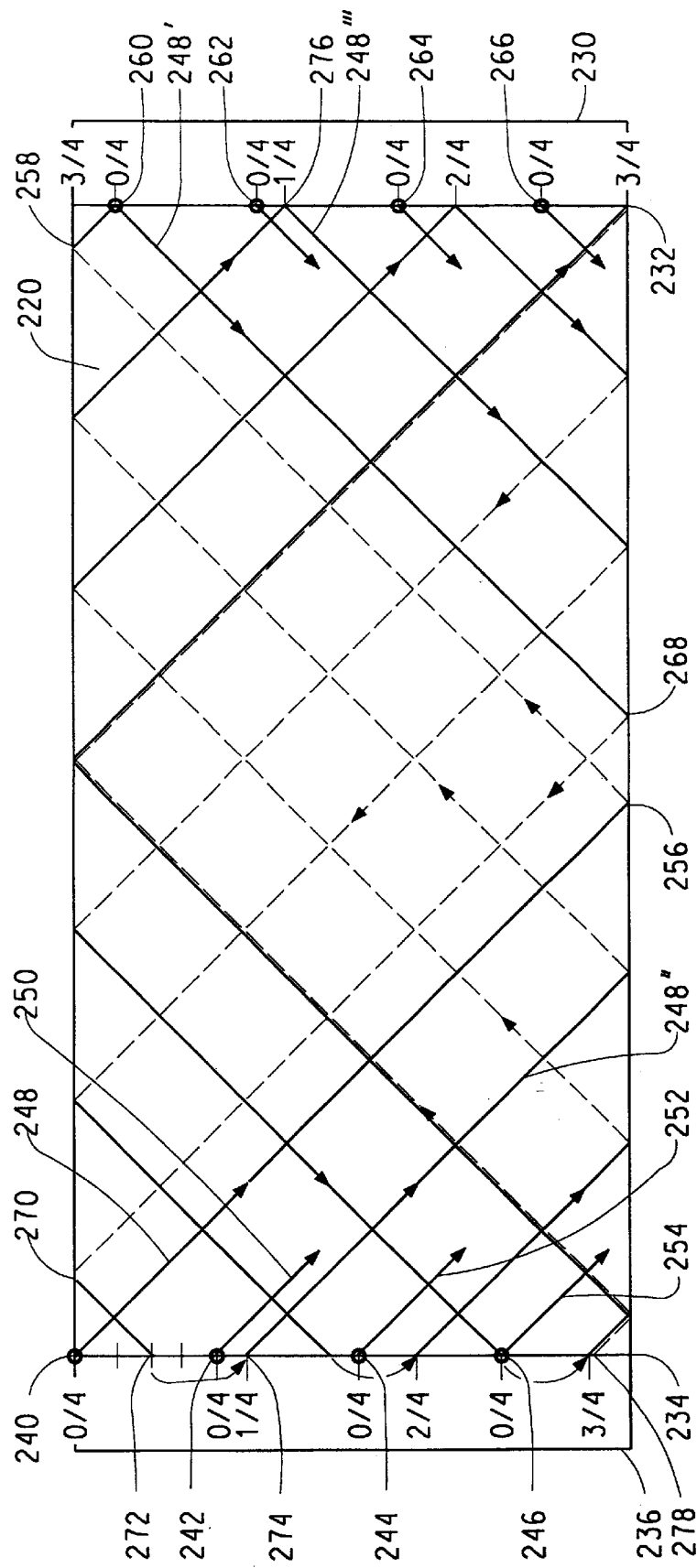
FIG. 11C shows a flattened view of a tubular fabric structure made on the apparatus of FIG. 11B.

The yarn laydown pattern and the motion of the table and mandrel will be discussed further referring to FIG. 11C which is an imaginary view of the mandrel as if it were flattened out into a two dimensional form. At the left of the figure is mandrel end 236 and pin ring 234, and at the right of the figure is mandrel end 230 and pin ring 232. In actual practice, the pattern would preferably be started at end 230 which is more accessible for threading up yarns, but for purposes of discussion the yarns are started at end 236. The dashed lines in the figure trace the yarn paths on the back side of the flattened mandrel; the solid lines trace the yarn paths on the front side. The yarns illustrated are only those that are seen to start on the front side of the figure at points 240, 242, 244, and 246; and of these, only the yarn starting at point 240 has its path traced throughout one complete laydown. These start points are those where the yarn is laid down by guides such as guide 224 in support 222. Four other yarns from support 222 would be tracing out similar paths starting on the back side of the flattened mandrel at the same spacing as the yarns shown on the front side. These points represent the first yarn position 0/4 of four possible positions for a first group in a cell space for the fabric. Yarn at point 240 follows path 248 as mandrel 220 rotates and translates relative to yarn guide support 222; while yarns at points 242, 244, and 246 follow paths 250, 252, and 254, respectively. Tracing path 248 for laying down yarn in a first group, path 248 passes to the back side of the flattened mandrel at 256 and returns to the front side at 258 and reaches the ring of pins 232 at 260. Similarly, another first group yarn from point 242 would reach the ring 232 at point 262; yarn from point 244 would reach the ring 232 at point 264; and yarn from point 246 would reach the ring 232 at point 266.

Assuming the yarn is instantly engaged by the pin ring 232, the mandrel rotation continued, and the mandrel translation reversed immediately, the yarn path 248' would start back along the mandrel from point 260 to lay down yarn in the second group. If this ideal situation did not exist, the translation of the mandrel would stop while the mandrel rotation continued for a few degrees to anchor the yarn in the pins. The points at the right end 230 of the mandrel represent the first yarn position 0/4 for a second group in a cell space for the fabric. Yarn path 248' passes to the back side of the flattened mandrel at 268 and returns to the front side at 270, and reaches the ring of pins 234 at point 272. It now must be decided what pattern of yarn positions are desired in the fabric. Assuming the next yarn position desired is the 1/4 position, and the mandrel will continue rotating in the same direction, the yarn landing at position 272 wants to be in position 274 before reversing the translation of the mandrel. The translation of the mandrel will stop when the yarn reaches point 272 and will dwell there while the mandrel rotates a few degrees until the yarn reaches point 274; and the translation will then reverse and the yarn will follow path 248". This will cause the yarn to land in the right pin ring 232 at point 276 which is also in the 1/4 position of the cell space. If this is the desired pattern for the second group cell space, the mandrel translation can immediately reverse and the yarn will return along path 248'''. If it is desired to change the yarn position for the cell, the translation of the mandrel can stop and the mandrel can continue rotating for a few degrees until the yarn is in the desired position in the cell space, and then the translation reverses and the yarn follows on a new path. The yarn pattern in a cell can then be different for the first group yarns and the second group yarns. This pattern will continue until the yarn from point 240 lands back at pin ring 234 at position 278. At that point all the yarn positions for the cell space are occupied by subgroups of yarns and the cylindrical batch of fabric structure is ready for bonding.

Ultrasonic bonding horn 219 can make repeated passes along the axis of the mandrel by orienting the horn to align with the mandrel axis and translating the mandrel without rotation under the stationary horn and rotating the mandrel through several degrees at the end of each pass to make spaced ultrasonic bond paths. Alternatively, the horn can be reoriented perpendicular to the mandrel axis and bonding can be along circumferential paths. If continuous bonding is preferred for a penetration resistant fabric, the ultrasonic horn passes can be abutting or the hot plate can be used to make abutting bonds. After bonding, the pin rings may be removed (by retracting or other means) and the fabric pushed off the mandrel. Alternatively, one end of the fabric may be cut at one pin ring and only the opposite pin ring removed. By pushing the fabric, it will expand, since the fabric is oriented on a bias relative to the mandrel axis, so it will be easy to slide the fabric off the mandrel. In a further alternative, the ultrasonic bonding horn may be used at a higher power setting to assist in cutting the fabric off the mandrel when the bonding is complete by making two circumferential cuts at the ends and an axial cut extending from end to end.

In some cases, it is desired to use the same circular guide support 222 (FIG. 11B) for structures having different numbers of yarns per cell so a different guide support does not need to be installed for routine changes in yarn denier or the like. One way to accomplish this flexibility is to use a special laydown pattern for yarns as discussed above referring to the split cell/single step process which would work well with this apparatus to make cells that would appear to have, and would perform as if there were, fewer numbers of yarns in each cell.

Another possibility is a method of operating the mandrel motor 238 and table actuator 209" to apply a multiple pass of yarns from guide support 222 to make actual changes in the number of yarns per subgroup in the structure. For instance, to double the number of yarns per subgroup, the yarns, such as yarns 226 and 226', could be laid down in a path designated by dashed lines 227 and which would add one yarn between the original yarns laid down by the guide.

There is a concern when laying down yarn on the mandrel of FIG. 11B that accumulated tolerances in alignment of the mandrel 220 and guide ring 222, rotational eccentricity of mandrel 220, and variations in yarn width may cause undesireable inaccuracies in the fabric structure. These concerns can be minimized by always starting the yarn passes along the mandrel from the same point. This can be controlled by identifying a "home" eyelet in the guide ring, such as eyelet 224 and a "home" fabric cell, such as cell 231. The "home" fabric cell should be the one aligned with the "home" guide ring at the best rotational alignment of the mandrel and guide ring. When starting each subgroup the "home" eyelet should be aligned over the "home" fabric cell as closely as possible for the particular pattern selected. Once a "home" cell is identified at one end, there will be a corresponding "home" cell at the opposite end that can also be returned to when making the next yarn laydown from that end. If yarn 226a is the first yarn laid down going from right to left from the home cell 231 at end 230 and yarn 226b is the first yarn laid down going from left to right from the home cell at end 236, it may be desirable to have the first yarn 226b land in the home cell 231 when it reaches end 230. This can be controlled by the amount of rotation at end 236 before starting the pass of yarn 226b. The advantage is that this may further minimize the variation in yarn laydown accuracy due to tolerance variations.

Figure 14:
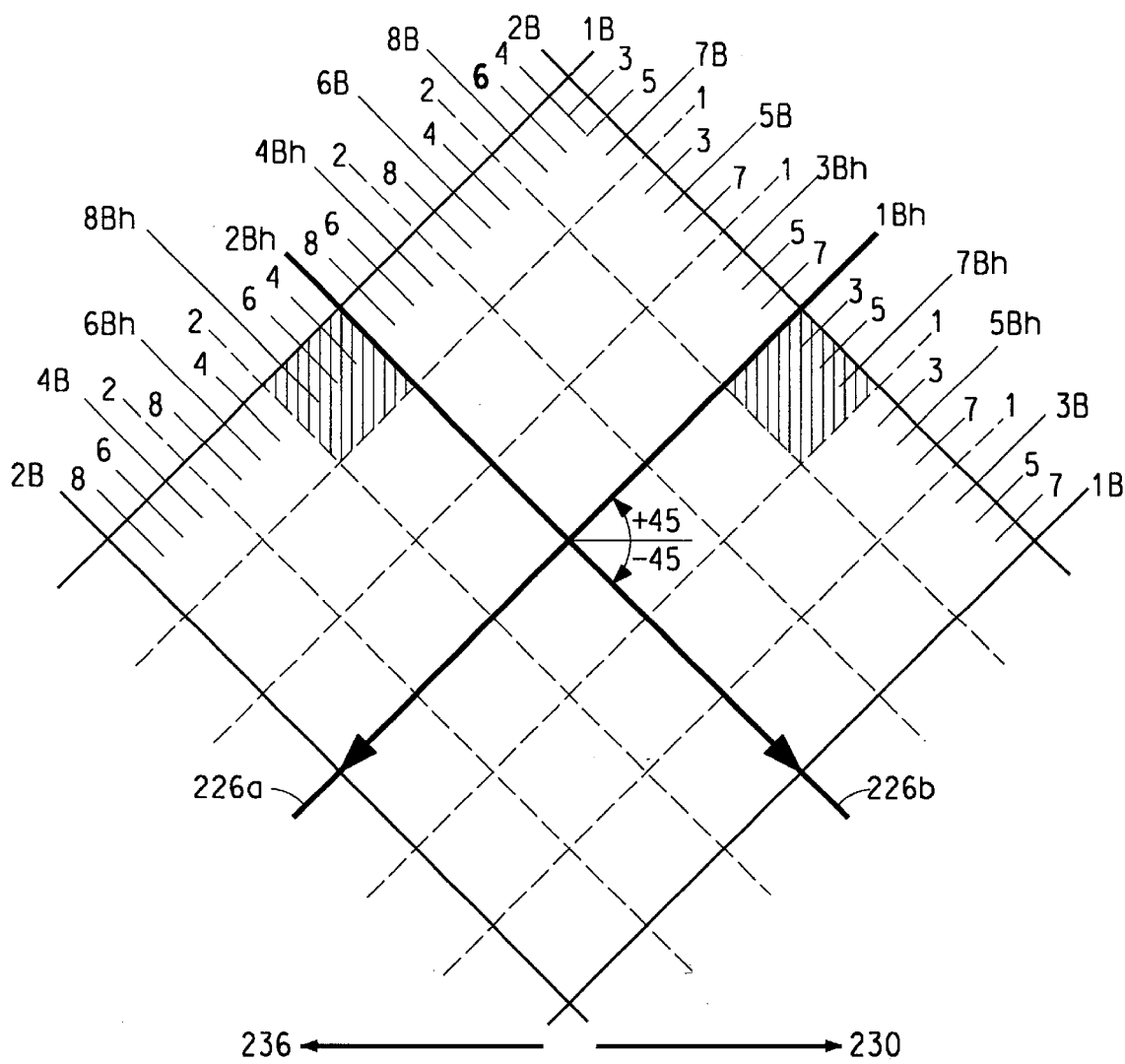
FIG. 14 is a schematic plan view of a portion of fabric that includes binder yarns.

When using binder yarn distributed in the eyelets of the guide ring 222, the binder yarn must be carefully placed in the cells to get uniform distribution in the final fabric structure. FIG. 14 shows a piece of fabric taken at portion 253 where the first yarns from the home cells cross. In this binder yarn fabric sample, the binder is placed at every third eyelet with a binder placed in the home eyelet 224. There are four yarns in every cell and the cell pattern is a simple cell/single step pattern. The binder is in addition to the structural yarn in the eyelet, so every binder yarn position also is a structural yarn position. There are structural yarns in all eyelets in the guide ring. In FIG. 14, the "B" designations identify binder yarn locations in the cell. The number designations in the diagonal areas at the top of the figure indicate the structural yarn positions in the cell, and the value of the number indicates the subgroup and sequence of yarn laydown. The first yarns laid down are numbered 1 and the last are numbered 8. The "h" designation indicated the yarn passing through the home eyelet which is also a binder yarn. The dashed lines indicate cell boundaries; there are 6×6 or 36 cells shown. The hatched cells represent the respective home cells with the home cell 231 represented on the right and the home cell at the opposite end represented on the left. As the mandrel in FIG. 11B moves from left to right, all the subgroup "1" yarns are laid down in the +45 degree direction; every third "1" yarn includes a binder yarn. The location of the home eyelet is labeled "1Bh". As the mandrel in FIG. 11B moves from right to left, all the subgroup "2" yarns are laid down in the −45 degree direction; every third "2" yarn is a binder yarn. The location of the home eyelet is labeled "2Bh".

When the mandrel end 230 reaches the guide ring 222, it is rotated at least 90 degrees and to a position to bring the home cell near the home eyelet at "1Bh". However, this time the binder yarn in the home eyelet is positioned at "3Bh" to begin the laydown of the third subgroup yarns in sequence. A similar process occurs at the opposite end 236 to position the home eyelet at "4Bh" to laydown the fourth subgroup yarns. When returning to end 230, the home eyelet is next positioned at "5Bh" and subsecluently at "7Bh", and the process continued until all 8 subgroups of yarn are laid down. By stepping the home eyelet containing the binder yarn in the sequence shown and staying close to the home cell, the binder yarns are uniformly distributed throughout the fabric. There is at least one binder yarn in the +45 direction and −45 direction for each of the 36 cells shown which is representative of the entire fabric. In addition, by returning the home cell to the home eyelet at end 230, variations in yarn laydown accuracy due to tolerance variations are minimized. If tolerances are tightly controlled, returning the home cell to the home eyelet each time would not be as critical. To get uniform binder distribution, the selection of the number of binder yarns in the guide, the number of yarns per cell, and the binder positioning sequence must be taken into consideration.

Figure 11D:
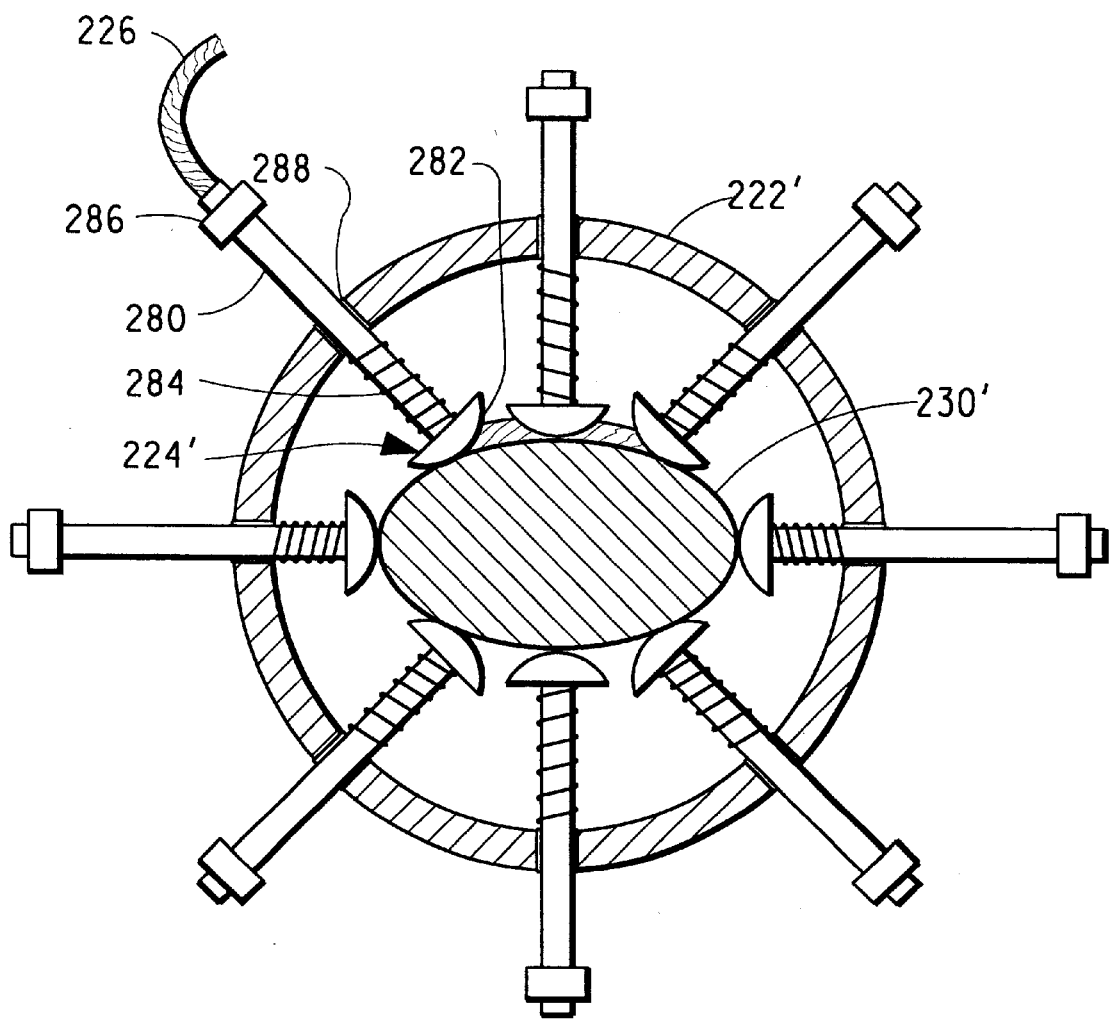
FIG. 11D shows a special device for laying down yarn.

There is a concern when laying down yarn on the mandrel of FIG. 11B that the path from the guide to the surface of the mandrel be as short as possible so the lay down position on the mandrel can be accurately predicted and controlled. A gap between the guide and the mandrel of less than ⅛ inch is desirable. Control of this gap is a concern in any of the yarn laydown devices. one way to accurately lay down the yarns with precision is to use the device in FIG. 11D which is shown in an end view of a mandrel 230' and circular guide support 222'. To illustrate a general case, the mandrel 230' is shown as an oval shape. It will be appreciated that the mandrel shape may also vary along its axis. Support 222' holds a plurality of guides, such as guide 224' that guides yarn 226. Each guide, referring to guide 224', includes a hollow shaft 280, a radiused guide tip 282, a spring 284, and a retainer 286. The shaft passes through a hole 288 in support 222'. Spring 284 is placed over shaft 280 between support 222' and tip 282 to thereby urge the tip toward the mandrel 230'. Yarn 226 passes through hollow shaft 280 and out through tip 282 and directly onto mandrel 230'. In this way, the yarn is laid directly onto the mandrel much as if it were "painted" on the mandrel surface. This insures accurate placement of the yarn on the mandrel. The shaft moves freely in hole 288 in support 222' to allow the guide tip to ride over any variations in the shape of the mandrel while the spring keeps tip 282, and the yarn 226 issuing therefrom, securely in contact with the mandrel surface. The tip 282 may advantageously be coated with a low friction coating for ease of sliding over the mandrel and the yarns laying thereon.

Figure 12:
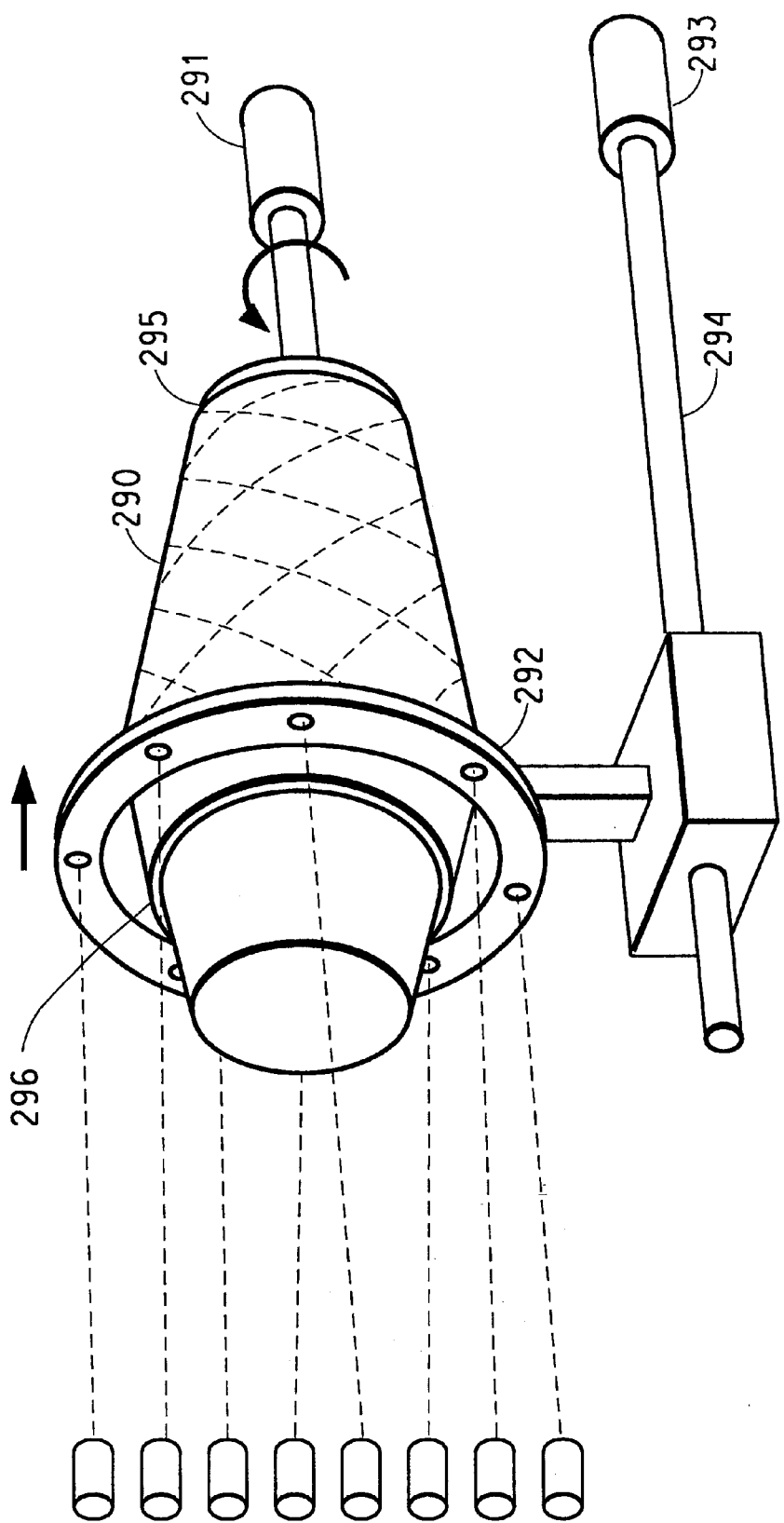
FIG. 12 shows another mandrel apparatus for making a single batch of three dimensional fabric structure.

FIG. 12 shows an apparatus that is used to make a simple three dimensional tubular batch fabric using a lathe-type device or a textile yarn winding device where the mandrel 290 rotates continuously by motor 291, but without translating, and the circular guide support 292 traverses along the mandrel axis back and forth driven by a cam or screw 294 rotated by a motor 293. Coordination of motors 291 and 293 provides control of the fabric structure. The pin rings of FIG. 11B may be eliminated by providing shoulders 295 and 296 to engage the yarn at the reversals and by keeping the bias angle low relative to the shoulder. This is a variation of the device shown in FIG. 11B which may allow fabrication of fabrics of the invention with slight modification of existing mandrel systems.

EXAMPLE 1

A preform for a composite panel was made using a non-thermoplastic yarn and sheets of thermoplastic film. The yarn was 840 denier continuous multifilament aramid flat yarn sold by E. I. du Pont de Nemours and Company under the trademark, Kevlar®. The film sheet was a 2–3 mil thick polyester film. The yarn structure was made using the device of FIG. 11B. Two subgroups of yarn were wound on the mandrel, followed by a film sheet, followed by four subgroups of yarn, followed by a film sheet, followed by four subgroups of yarn, followed by a film sheet, followed by four subgroups of yarn, followed by a film sheet, followed by two subgroups of yarn, for a total of 16 subgroups of yarn and four film sheet. The film made up about 15% by weight of the structure. The structure was bonded circumferentially using an ultrasonic generator made by the Dukane Co., model #351 Autotrack, which was operated at 40 kHz with a force against the mandrel of about 4–5 lbs. The horn speed along the mandrel was such that about 0.2 joules per bond of ultrasonic energy was applied to the yarn structure. The bond paths were spaced about 0.2 inch apart and the horn tip was about 0.1 inch wide and 0.75 inch long with a slightly concave surface across the 0.1 dimension for about 0.5 inch of the length. At the concave end of the bonding surface, there was a radius to eliminate the leading corner and the concavity followed the radius. The horn did not make full contact along the 0.75 inch dimension due to the radius of the mandrel. The horn made highly bonded regions at the edges of the concave surface. The fabric was removed from the mandrel and was found to have adequate integrity for handling as a composite preform.

EXAMPLE 2

A flexible penetration resistance stabilized composite yarn structure was made to resist penetration. As proof of performance, it was tested in a ballistics application. It was made by incorporating polymeric webs of thermoplastic resin in the yarn structure during fabrication to thereby have the resin act as a distributed binder to hold the yarn fibers together. The webs were in the form of a film. By varying the film thickness and/or the number of sheets, the amount of resin in the structure can be varied. In this example, the resin was 16% of the structure by weight. A sample was made using 850 denier aramid yarn sold under the trademark Kevlar® KM2 by E. I. du Pont de Nemours and Company of Wilmington, Del. 19880. It is a continuous multifilament yarn comprising 560 filaments with 1.52 denier/filament, and has a breaking tenacity of 26.4 grams/denier, a modulus of 570 grams/denier, an energy to break of 43.9 joules/gram, and an elongation to break of 3.9%.

The structure was made by winding yarn on the device of FIG. 11B. A 12-½ inch diameter mandrel was covered with a polyimide film and a polytetrafluoroethylene coated fiberglass fabric to protect the surface of the mandrel 220, and provide some resilience to the surface. The pin rings on the opposed ends of the mandrel comprised 720 pins uniformly spaced around the circumference closely spaced to the ends of the mandrel to provide accurate positioning of the yarn strands there. There is adequate space between pins for the yarn strands to easily slide past to reach the surface of the mandrel without requiring excess tension. The useable fabric structure is formed about 1–2 inches in from the pin rings where the precise yarn position has stabilized.

A rectangular piece of 1 mil thick polyethylene film (low molecular weight) was attached to the surface of the mandrel by applying two pieces of double sticky tape to attach two corners of the film to the outboard ends of the mandrel surface and along the mandrel axis. The film was wrapped over the circumference of the mandrel and the remaining two corners were attached to the double sticky tape. The film end was arranged at a position on the mandrel where the sample would be cut for removal and the film ends were brought together and cut so there was no overlap.

One hundred strands of the aramid yarn were threaded up in the support 222 and were brought together at the center of the support and taped together and the excess cut off. The mandrel was aligned with the support 222 and was advanced through the annular support 222 until the pin ring 232 began to engage the yarns. The yarn guides protruding from the inner surface of the ring were spaced within about ⅛ inch from the mandrel surface to insure good accuracy of yarn laydown. The mandrel then began a program of advancing and rotating to lay down the 100 yarn strands onto the surface of mandrel 220 at an angle of 45 degrees to the axis of the mandrel to form yarn subgroup 1 of yarn group I. When the strands reach the pin ring 234, the mandrel stops rotating and continues advancing and stops where the pin ring 234 and the end 231 of the mandrel 220 are beyond the circular yarn guide support 222. The mandrel then rotates 180 degrees and stops. When the mandrel 220 is beyond the support 222 and is then rotated, the yarns wrap over mandrel end 231 and twist around one another and the support shaft at the center of the end 230. The purpose is to "lock" the yarn strands over the pins at the end of the mandrel and to accurately control yarn positioning in the pins. To minimize lateral yarn shifting at the mandrel ends, the yarn should travel close to a radial path at the end of the mandrel, and depart and approach the pins along the axis of the mandrel. Following this, the mandrel retracts through the support 222, and begins laying down additional yarn on the surface of mandrel 220 by rotating during retracting after the pin ring 234 is past the support 222.

The retracting and rotating mandrel lays down the 100 strands of yarn at an angle of 45 degrees to the axis of the mandrel so the yarns are laid down across the previously deposited yarn at an angle of 90 degrees to form yarn subgroup 1 of yarn group II.

When the yarn strands reach the pin ring 232 once again, the mandrel stops rotating and retracts beyond the circular yarn guide support 222. The mandrel then rotates 180 degrees to lock the yarn in pin ring 232 as was done with pin ring 234. When the mandrel 220 is beyond the support 222 and is then rotated, the yarns wrap over mandrel end 230 and twist around one another at the center of the end 230. For greater precision, the home cell laid on the mandrel would be rotated whatever amount is required (which may be more or less than the 180 degrees locking rotation mentioned) to return to the home eyelet on the ring to begin the next laydown. This was not done for this example. Following this, the mandrel advances back through the support 222, and begins laying down additional yarn on the surface of mandrel 220. The mandrel is controlled so the next group I yarn strands for subgroup 2 are laid down precisely adjacent the previously deposited yarn strands in subgroup 1, group I and at 45 degrees to the mandrel axis. Adjacent group I yarns should be abutting or overlapping in the final structure to completely cover the mandrel without gaps. When 12 yarns of a nominal 30 mil width are distributed over a 280 mil cell distance, it is expected that overlap of the yarn will occur. This will be beneficial in eliminating "holes" in the final layer structure due to shifting yarn positions or width variations. This is important in a layer used in a penetration resistant article. This next laydown forms yarn subgroup 2 of yarn group I. At the opposite end, as the strands engage pin ring 234 again, the process for this end is repeated and the mandrel is controlled so the yarn strands for subgroup 2 of group II are laid down adjacent the previously deposited yarns in subgroup 1, group II and at 45 degrees to the mandrel axis. This forms yarn subgroup 2 of yarn group II. This process continues until there are 6 subgroups of yarn in each group and the surface area of the fabric is about ¾ covered with yarn (two quadrants each covered with yarn from one group and one quadrant covered with yarn from both groups). At this time another sheet of 1 mil thick polyethylene film is placed on the mandrel as was done at the beginning of the fabric structure. Another 6 subgroups of each group of yarn are laid down over the second film layer so that each of the two groups of 12 yarns each completely cover the area of the fabric. Another sheet of film is placed over the yarn as before. This completes the lay up of materials to form an individual layer of the structure.

At this point, a cover sheet of polytetrafluoroethylene coated fiberglass is wrapped circumferentially over the yarn structure on the mandrel 220 and is taped in place at the ends of the mandrel in preparation for stabilization of the structure so the yarn is locked in place. Stabilization has been achieved by two methods:

1) Ultrasonics: The mandrel is indexed sideways to be adjacent an ultrasonic bonder comprising an ultrasonic driver having a ½ inch wide bonding horn that contacts the cover, and an actuator that presses the horn against the mandrel with a predetermined force. The mandrel is rotated and advanced past the horn while the horn is energized so the horn passes over the entire yarn surface by stepping along the mandrel axis in sequential rings. Alternatively, the horn may follow a spiral path. For the polyethylene film in this example, the horn energy is 150 watts. This melts the three layers of polyethylene film and stabilizes the location of the yarns in the yarn structure. The horn is now changed on the ultrasonic driver to a horn that has a narrow blade that can melt and fracture the yarn. The mandrel is positioned and rotated so the horn makes a circumferential cut of the fabric adjacent the inboard side of the pin rings 232 and 234. The horn is then rotated 90 degrees and the mandrel is positioned to pass by the horn for an axial cut from one end to the other end of the mandrel. With minor additional cutting along the horn path with a knife, the stabilized yarn structure can now be removed from the mandrel as a sheet and the excess at the pin rings can be removed and discarded.

2) Flat hot plate: A flat hot plate about 6 inches square is manually positioned against the fiberglass covered mandrel and is rocked back and forth over the surface to heat a rectangular portion of the sample. The surface temperature of the hot plate is 600 degrees F. (316 C). Alternatively, the system illustrated in FIG. 11B can be used which would comprise the following: The mandrel is indexed sideways to be adjacent a hot plate bonder comprising a 6.5 inch long hot plate with a surface curved to match the yarn-covered mandrel surface (the curved length is 7-¾ inches), and an actuator that presses the hot plate against the mandrel with a predetermined force. The mandrel is positioned adjacent the hot plate and the hot plate is raised to contact the cover sheet on the yarn structure on the mandrel. For the polyethylene yarn in this example, the hot plate surface temperature is 600 degrees F. (316° C.); and it is held in contact with the fiberglass cover on the stationary mandrel for 30 seconds.

Regardless of the hot plate used, the hot plate is then retracted and the mandrel is rotated and advanced as required to place an unbonded portion of the fabric structure adjacent the hot plate. This process is repeated until the entire yarn structure has been heated once.

If the curved hot plate alternative is used, the curved hot plate is then pressed against the cover, and the mandrel slowly rotated at 2 inches/second while contact is maintained until the complete circumference of the mandrel as wide as the hot plate has contacted the hot plate. The mandrel is then advanced one hot plate width and this process repeated until the entire yarn structure has been heated a second time and is stabilized.

Upon examining the stabilized flexible sheet, it is observed that the upper and lower surfaces are smooth to the touch and the resin appears to be a continuous coating over the first (top) and last (bottom) yarns. When a cross-section is examined under magnification, the resin from the first (top) sheet of film meets and blends with the resin from the intermediate sheet of film at spaced locations throughout the yarn structure; and the resin from the (last) bottom sheet of film meets and blends with the resin from the intermediate sheet of film at spaced locations throughout the yarn structure.

The stabilized composite can now be handled without damage to the fabric structure. A ballistics composite article for testing is constructed by taking the large flexible sheet and cutting out 12 inch square pieces, each referred to as a layer, of stabilized structure. To further consolidate the structure containing the polyethylene film, it is now placed in a press (6 layers at a time with release sheets between layers) and heated to a temperature of 175 degrees C. (350° F.) and pressed with a pressure of 100 psi for 1 hour and cooled to a handling temperature while under pressure to complete the individual layer of a composite.

Thirteen layers of consolidated structure are stacked together without bonding between layers. The layers are joined to form a ballistics article by attaching them at the edges by sewing or application of tape folded over the edges. The yarns in each 12×12 piece/layer are oriented as they are in the large sheet with the yarns on a 45 degree bias relative to the edges of the piece/layer. The test samples are flexible, but are somewhat stiff (have a low drape). In actual use, it is anticipated the composite articles would be placed in pouches in a nylon vest at several locations around the body of the vest to protect the torso of the wearer.

A ballistic test sample is then placed on a support that includes a soft clay portion in contact with the sample similar to the National Institute of Justice standard NIJ 0101.03. The backing and sample are arranged opposite a projectile firing device. A pattern of six projectiles is fired at the test sample in accordance with MIL Standard 662E (similar to now revised 662F). The velocity of the projectile is incrementally increased until a projectile penetrates the test sample and is then incrementally decreased until the projectile does not penetrate the test sample. The average between the penetrating and non-penetrating velocities, as calculated following the MIL-std-662E(F), is designated the V50 velocity. For a test sample to pass the penetration test it is compared to a standard woven sample. In some cases, for particular projectiles and end uses, there are particular V50 velocity that should be achieved. As a point of reference, for NIJ Standard 0101.03, a protective ballistic article, for type III-A ballistics resistance, should achieve a V50 above 1400 ft/sec for a 9 mm full metal jacket, 124 grain bullet or a 0.44 magnum lead semi-wadcutter gas-checked 240 grain bullet.

The following table indicates the V50 velocities for several test conditions for several test samples. The area density is the weight of one square foot of the ballistic test sample. It is desirable to have the area density (A.D.) less than or equal to 1.0 pound per square foot for a flexible ballistic structure with a comfortable weight for the wearer.

A control sample was tested for comparison. It is a tightly woven fabric of the same aramid fiber as the test samples herein and is without any resin stabilizing material. It is prepared to meet the requirements of MIL-C-44050A, Type III. Twenty one layers of woven fabric are joined to make the control composite article so a comparison of articles with the same A.D. can be made. The layers of woven fabric are lighter since they do not contain any resin.

In the tables below, the composite article of the invention described above comprising film sheets and yarn subgroups is indicated by A6A6A-13 where A represents one sheet of one mil polyethylene film, 6 represents six subgroups of two groups of yarn, and 13 represents thirteen layers of the A6A6A structure.

| sample | fabric struct | A.D. (psf) | fragments 17 gr. 0-deg | 17 gr. 45 deg | bullets 9 mm 0-deg | 44 meg. 0-deg | stabilize method |
|---|---|---|---|---|---|---|---|
| 9-1 | A6A6A-13 | 1.03 | 1806 | | | | 2 |
| 9-2 | A6A6A-13 | 1.03 | | 1845 | | | 2 |
| 9-3 | A6A6A-13 | 1.03 | | | 1527 | | 2 |
| 9-4 | A6A6A-13 | 1.0 | 1829 | | | | 2 |
| 9-5 | A6A6A-13 | 1.0 | | 1880 | | | 2 |
| 9-6 | A6A6A-13 | 1.0 | | | 1574 | | 2 |
| 9-7 | A6A6A-13 | 1.0 | | | | 1402 | 1 |
| C-8 | woven-21 aramid 850 den | 1.0 | 1800 | | | | no |
| C-9 | woven-21 aramid 850 den | 1.0 | | | 1550 | | no |

The A6A6A-13 composite of 1.0 A.D. performed as well as a standard woven aramid composite of the same A.D. and used less aramid yarn, which results in less material cost. If the same amount of aramid yarn is used in the composite of the inventive example, more protection would be offered by the inventive example, but at a slightly higher A.D.

EXAMPLE 3

A flexible fabric structure was made similar to Example 2, samples 1-1 to 1-7 except the binder material was a polyethylene film 0.5 mils thick and the resin component of the structure was reduced from 16% to 10% by weight. This structure was designated B6B6B. The fabric was stabilized as in Example 2, so it can be handled without damage to the fabric structure. Unlike Example 2, this stabilized fabric was not further consolidated.

A ballistics composite for testing is constructed by taking the large sheet and cutting out 12 inch square pieces of stabilized fabric and stacking 14 pieces together and attaching them at the edges by sewing or application of tape folded over as in Example 2. The test samples are flexible, but are somewhat stiff (have a low drape). The results of testing the 14 layer ballistic test sample as in Example 2 is summarized below.

| sample | fabric structure | A.D. (psf) | 9 mm 0-deg | stabilize method |
|---|---|---|---|---|
| 10-1 | B6B6B-14 | 1.0 | 1482 | 1 |

This composite article with less resin and more aramid yarn than the Example 2 test samples performed acceptably.

EXAMPLE 4

A flexible composite structure was made similar to Example 3 except the central sheet of film was omitted and the yarn was laid up in 12 subgroups of each group without interruption. The resultant composite layer had a resin content of 6% by weight of the composite structure.

A ballistics composite for testing is constructed by taking the large sheet and cutting out 12 inch square pieces of stabilized fabric and stacking 15 pieces together and attaching them at the edges by sewing or application of tape folded over as in Example 2. The test samples are flexible, but are somewhat stiff (have a low drape). The results of testing the 15 layer ballistic test sample as in Example 2 is summarized below.

| sample | fabric structure | A.D. (psf) | 9 mm 0-deg | stabilize method |
|---|---|---|---|---|
| 11-1 | B12B-15 | 1.03 | 1539 | 1 |

This composite article with less resin and more aramid yarn than Examples 2 or 3 performed acceptably, even though the extra step of adding resin in the middle of the structure was omitted. The lower amount of resin was still sufficient to keep the yarns in place in the structure.

EXAMPLE 5

A rigid ballistic composite article was made using the flexible fabric structure similar to Example 2 to produce the layer to be used for the rigid ballistic composite.

A ballistics composite for testing is constructed by taking the large stabilized flexible sheet of Example 2 and cutting out 12 inch square pieces of stabilized yarn structure and stacking 21 layers together. The individual layers are not consolidated. The stack of layers without release sheets was then joined to form an article by placing it in a press and subjecting it to a temperature of 300 degrees F. (149 C) and a pressure of 500 psi for 1 hour; then cooling to a temperature for handling while under pressure. This produced a rigid ballistic composite article that had the layers bonded to one another. The test samples are rigid and have zero drape. For scouting purposes to determine the performance of the rigid ballistic test articles, it is desirable that the samples have an A.D. of about 1.6 and a V50 for a 17 grain fragmentation projectile of about 2250. The results of testing the rigid 21 layer ballistic test sample as in ex. 9 is summarized below.

| sample | fabric structure | A.D. (psf) | fragment 17 gr 0-deg | stabilize method |
|---|---|---|---|---|
| 12-1 | A6A6A-21 | 1.65 | 2260 | 2 |
| 12-2 | A6A6A-21 | 1.63 | 2271 | 2 |

The test samples performance exceeded the desired limits.

EXAMPLE 6

A flexible structure was made similar to Example 2, except the resin was introduced into the structure by adding it in the form of binder yarns instead of adding it in the form of a film as in Example 2. The binder yarns were added by placing binder yarns in a plurality of the yarn guide eyelets in the yarn support 222. This is in addition to the structural aramid yarns being guided by the eyelet in the support. The aramid yarn strands were of the same composition as used in Example 2, except the yarn denier was 600 denier. The film of Example 2 was omitted entirely for this example.

For this example, the binder yarn is a 630 denier nylon 6,6 yarn comprising 210 filaments of about 3.0 denier/filament. A binder yarn is placed in every third eyelet of the 100 eyelets in the support 222. Twelve subgroups of yarn in each of groups I and II of yarn are laid down on the mandrel. The subgroups include the distributed binder yarn so the amount of resin in the structure is 24% by weight. The structure is stabilized by covering with the fiberglass sheet as in Example 2 and using the application of ultrasonic energy (150 watts on the ½ inch wide horn). Upon examining the stabilized flexible sheet, it is observed that the upper and lower surfaces are rough to the touch and the resin appears to be an intermittent coating over the top and bottom yarns.

A ballistic article was not actually produced from this structure, but it is believed the following procedure would provide a useable ballistic article. The stabilized fabric will be consolidated as in Example 2 under the following conditions: temperature of 450 degrees F. (232 C) and pressure of 200 psi for 1 hour. A ballistic composite article for testing could be produced following the procedures as in Example 2 and comprising 12 layers to make an article having a 1.0 pound per square foot A.D. Based on the performance of similar articles, it is believed this ballistic article will have a V50 for a 9 mm projectile at zero degrees that will be very close to 1400 ft/sec. To provide more reliable performance at a higher V50, the A.D. could be increased by adding more layers to the article, or the % resin could be reduced slightly and more structural yarn substituted to provide an article with the same A.D.

EXAMPLE 7

A flexible yarn structure was made similar to Example 6, except, for this example, the binder yarn is a 600 denier polypropylene yarn comprising 288 filaments of 2.08 denier/filament and fewer binder fibers are used. A binder yarn is placed in every fifth eyelet of the 100 eyelets in the support 220. Twelve subgroups of yarn in each of groups I and II of yarn are laid down on the mandrel. The subgroups include the distributed binder yarn so the amount of resin in the individual layer structure (and the final article) is 16% by weight.

The structure is stabilized differently than Example 6. The structure is stabilized by covering it with the fiberglass sheet as in Example 2 and using the application of a curved hot plate to bond the fabric on the mandrel to stabilize it. The hot plate temperature is 310 degrees C. (450F) and is held in place for 30 seconds. The stabilized structure is removed from the mandrel as in Example 2.

A ballistic article was produced as follows. The stabilized yarn structure was consolidated using the following conditions: a temperature of 232 degrees C. (450F) at 200 psi for 1 hour. A ballistic composite article for testing was produced comprising 18 layers as in Example 6. The article had an area density of 0.99. The article had the following ballistic performance for a 9 mm projectile at zero degrees.

| sample | fabric structure | A.D. (psf) | 9 mm 0-deg | stabilize method |
|---|---|---|---|---|
| 14-1 | 16%PP-18 | 0.99 | 1572 | 2 |

EXAMPLE 8

It is believed a rigid ballistic composite article could be made using the flexible structure similar to Example 7 to produce the layer to be used for the rigid ballistic composite.

A ballistics composite for testing would be constructed by taking the large flexible sheet and cutting out 12 inch square pieces of consolidated yarn structure and stacking 21 pieces together. The stack of layers would then be placed in a press and subjected to a temperature of 204 degrees C. (400F) for 1 hour at a pressure of 500 psi, and cooled before releasing the pressure. This would produce a rigid ballistic composite article that would have the layers bonded to one another. The test sample would be rigid and have zero drape. For these rigid ballistic test samples, it is desirable to have an area density (A.D.) of about 1.6 pounds per square foot and the V50 for a 17 grain fragment projectile of about 2250 ft/sec.

It is believed this article will have an area density about 1.6 psf and it is believed this ballistic article will have a V50 for a fragmentation projectile at zero degrees that will exceed 2250 ft/sec.

EXAMPLE 9

A flexible structure was made similar to Example 6, except the binder resin was introduced into the structure by adding it in the form of binder filaments wrapped around the outermost subgroups of yarns placed adjacent the top and bottom surface of the structure. The wrapped binder yarns were placed in all of the yarn guide eyelets of the yarn support 222. In this case, the yarn support only used 24 eyelets containing yarn and the mandrel was only 5.91 inches in diameter. The cell distance was 0.53 inches and the laydown pattern was the split cell single step (similar to FIG. 4C) where the second pass of yarn in each group divides the cell in two equal portions and both portions are built up together so it appears that the cell distance is only 0.265 inches. This pattern has the advantage that fewer yarns are needed in the creel, but twice as many passes in each group are required to complete the pattern. No significant overlap of yarn occurred between the yarns in a given group.

The binder yarn was made by the DREF process and comprised a core of 850 denier aramid yarn, as was used in Example 2, wrapped with nylon 6,6 staple fibers to produce a composite binder/structural yarn of 1500 denier. To begin the structure, 24 ends of this binder/structural yarn was laid down in a first pass over and back on the mandrel to define the basic cell structure and the mandrel was then indexed over to place the next pass of over and back yarns in the center of the basic cell structure. The ring 222 was then replaced with another ring 222 containing 24 ends of the 850 denier aramid yarn. The mandrel 220 was advanced and retracted through the support 222 for 15 passes over and back with the aramid structural yarn. The ring containing structural yarn was then replaced with the first ring containing binder/structural yarn and the mandrel was advanced and retracted through the ring to lay down the last two passes over and back of yarn to complete the cell, this time laying down the binder/structural yarns. The structure was stabilized by using an narrow ⅛ inch wide ultrasonic horn passing in spaced paths around the circumference of the mandrel that resulted in coverage of about 50% of the structure surface. The yarn structure on the mandrel was covered with a sheet of polyimide and the horn was pressed against the sheet with a force of 8 pounds. The horn was energized at 40 kHz with a net bonding energy of 23.5 watts and was traveled over the mandrel at a speed of ¾ inches per second. The stabilized layer was cut off the mandrel to form a flat sheet.

It is believed that if this layer was consolidated as in Example 13 for nylon binder resin, a multiple layer ballistic structure of about 1.0 pound per square foot A.D. could be made that would achieve a V50 of about 1400 ft/sec.

What is claimed is:

1. A flexible penetration resistant stabilized composite, comprising:
    an interlaced yarn structure of yarns having a tenacity of at least 8 g/d, a tensile modulus of at least 150 g/d and an energy to break of at least 10 j/g, the yarn structure further comprising:
        a plurality of first yarn subgroups having a plurality of yarns oriented in a first direction free of crossings and a plurality of second yarn subgroups having a plurality of yarns oriented in a second direction free of crossings;
        the yarns in each subgroup following substantially parallel paths that are spaced apart at a repeating cell distance of three or more yarn widths to sparsely cover a common predetermined fabric area; the yarn subgroups are arranged with a first subgroup next to a second subgroup, wherein the yarns in the first subgroup cross the yarns in the second subgroup to form a stack of yarns with each subgroup at a different level within the stack;
        the yarns in successive ones of the plurality of first yarn subgroups have a predetermined width and the yarns in said first yarn subgroups are offset from each other by a distance equal to or less than the width of a yarn in that subgroup; and
        the yarns in successive ones of the plurality of second yarn subgroups have a predetermined width and the yarns in said second yarn subgroups are offset from each other by a distance equal to or less than the width of a yarn in that subgroup,
        whereby the yarns in the successive first yarn subgroups abut or partially overlap with another and the yarns in the successive second yarn subgroups abut or partially overlap with another,
        the stacking of all of the plurality of first subgroups forming a first yarn group comprising yarns that densely cover the predetermined fabric area, the stacking placing as many yarns in the cell distance of the first subgroups as there are subgroups in the first group, and the stacking of all of the plurality of second subgroups forming a second yarn group comprising yarns that densely cover the predetermined fabric area, the stacking placing as many yarns in the cell distance of the second subgroups as there are subgroups in the second group, the outermost subgroups in the stack forming a top and bottom of the stack; and
        a first polymeric web comprising a thermoplastic resin, a thermosetting resin or a combination thereof which web is coextensive with, in contact with, and is bound to the surface of a first one of the subgroups;
        wherein the polymeric web comprises between 5–25% by weight of the composite, and the polymeric web at least partially contacts and is bound to the yarns in all the subgroups in the stack, to thereby contain the subgroups in the stack in an interlaced yarn structure.

2. The flexible penetration resistant stabilized composite of claim 1, further comprising:
    the yarns in successive ones of the plurality of first yarn subgroups are offset from each other by less than the width of a yarn in that subgroup; and
    the yarns in successive ones of the plurality of second yarn subgroups are offset from each other by less than the width of a yarn in that subgroup,
    whereby the yarns in the successive first yarn subgroups partially overlap one another and the yarns in the successive second yarn subgroups partially overlap one another.

3. The flexible penetration resistant stabilized composite of claim 1, further comprising at least a second polymeric web spaced from said first polymeric web and comprising a thermoplastic resin, a thermosetting resin or a combination thereof which web is coextensive with, in contact with, and is bound to the surface of a second one of the subgroups.

4. The flexible penetration resistant stabilized composite of claim 3, wherein the first polymeric web is positioned on the first subgroup of the yarn structure, and the second web is positioned on the last subgroup of the yarn structure.

5. The flexible penetration resistant stabilized composite of claim 4, further comprising a third polymeric web spaced from said first and second polymeric webs and comprising a thermoplastic resin, a thermosetting resin or a combination thereof which is coextensive with, in contact with, and is bound to the surface of a third one of the subgroups.

6. A flexible penetration resistant stabilized composite, comprising:
    a plurality of layers of the composite of claim 4 that are arranged with the top of the stack of one yarn structure contacting the bottom of the stack of another yarn structure, the contacting being free of fusion bonding to form a flexible composite article.

7. The flexible penetration resistant stabilized composite of claim 5, wherein the third web of resin is centrally located between the first and second polymeric webs and wherein the third web is bonded to the first and second webs at spaced locations throughout the yarn structure.

8. A flexible penetration resistant stabilized composite of claim 1, wherein the composite is a shaped three dimensional yarn structure.

9. A rigid penetration resistant composite article comprising:
    a plurality of layers of the composite of claim 1 that are arranged with the top of the stack of one yarn structure contacting the bottom of the stack of another yarn structure and wherein the plurality of layers are fusion bonded to each other and consolidated.

10. The flexible penetration resistant composite of claim 1, wherein yarns in the yarn structure have a tenacity of at least 20 g/d, a tensile modulus of at least 500 g/d, and an energy to break of at least 30 j/g.

11. The flexible penetration resistant composite of claim 1, wherein the yarns comprise polyethylene fibers, nylon fibers, aramid fibers or mixtures thereof.

12. The flexible penetration resistant composite of claim 1, wherein the polymeric webs comprise polypropylene, nylon, or polyethylene.

13. The flexible penetration resistant composite of claim 1, wherein the polymeric webs are in the form of a film.

14. The flexible penetration resistant composite of claim 1, wherein the polymeric webs are in the form of a fibrous network.

15. The flexible penetration resistant composite of claim 1, wherein the polymeric webs are in the form of a fibrous network in a polymer matrix.

16. A flexible penetration resistant stabilized composite, comprising:
    an interlaced yarn structure of yarns having a tenacity of at least 8 g/d, a tensile modulus of at least 150 g/d and an energy to break of at least 10 j/g, the yarn structure further comprising:
        a plurality of first yarn subgroups having a plurality of yarns oriented in a first direction free of crossings and a plurality of second yarn subgroups having a plurality of yarns oriented in a second direction free of crossings;
        the yarns in each subgroup following substantially parallel paths that are spaced apart at a repeating cell distance of three or more yarn widths to sparsely cover a common predetermined fabric area; the yarn subgroups are arranged with a first subgroup next to a second subgroup, wherein the yarns in the first subgroup cross the yarns in the second subgroup to form a stack of yarns with each subgroup at a different level within the stack;
        the yarns in successive ones of the plurality of first yarn subgroups have a predetermined width and the yarns in said first yarn subgroups are offset from each other by a distance equal to or less than the width of a yarn in that subgroup; and
        the yarns in successive ones of the plurality of second yarn subgroups have a predetermined width and the yarns in said second yarn subgroups are offset from each other by a distance equal to or less than the width of a yarn in that subgroup,
        whereby the yarns in the successive first yarn subgroups abut or partially overlap with another and the yarns in the successive second yarn subgroups abut or partially overlap with another,
        the stacking of all of the plurality of first subgroups forming a first yarn group comprising yarns that densely cover the predetermined fabric area, the stacking placing as many yarns in the cell distance of the first subgroups as there are subgroups in the first group, and the stacking of all of the plurality of second subgroups forming a second yarn group comprising yarns that densely cover the predetermined fabric area, the stacking placing as many yarns in the cell distance of the second subgroups as there are subgroups in the second group, the outermost subgroups in the stack forming a top and bottom of the stack; and
        a plurality of spaced binder yarns introduced coextensive with a predetermined yarn of each subgroup, the binder yarns distributed at predetermined positions relative to the subgroup yarns, the binder yarns comprising a thermoplastic resin, a thermosetting resin or a combination thereof;
        wherein the binder yarns comprise between 5–25% by weight of the composite, and the binder yarns at least partially contact and are bound to yarns in the stack to thereby contain the subgroups in the stack in an interlaced yarn structure.

17. A method of forming an interlaced penetration resistant fabric structure comprising:
    laying down a first yarn subgroup having a plurality of yarns having a first predetermined width, the yarns oriented in a first direction free of crossings, the yarns in the first subgroup following substantially parallel paths that are spaced apart at a repeating cell distance of three or more yarn widths to sparsely cover a predetermined fabric area;
    laying down a second yarn subgroup next to and crossing the first yarn subgroup, the second yarn subgroup having a plurality of yarns having a second predetermined width, the yarns oriented in a second direction free of crossings, the yarns in the second subgroup following substantially parallel paths that are spaced apart in a repeating cell distance of three or more yarn widths to sparsely cover the predetermined fabric area;
    continuing alternately laying down a plurality of first yarn subgroups and a plurality of second yarn subgroups to form a stack of yarn with each subgroup at a different level within the stack and the outermost subgroups forming a top and bottom of the stack comprising the substeps of:
        placing the plurality of yarns in any one subgroup of the plurality of first subgroups in the cell distance of the first-laid of the first subgroups and offset from a direct overlapping alignment with the plurality of yarns in all other subgroups of the first plurality of subgroups by a distance equal to or less than said first yarn width to thereby abut or partially overlap one subgroup with another, and laying down all the yarns in one of the first plurality of subgroups before laying down the yarns in another subgroup;
        placing the plurality of yarns in any one subgroup of the plurality of second subgroups in the cell distance of the first-laid of the second subgroups and offset from a direct overlapping alignment with the plurality of yarns in all other subgroups of the second plurality of subgroups by a distance equal to or less than said second yarn width to thereby abut or partially overlap one subgroup with another, and laying down all the yarns in one of the second plurality of subgroups before laying down the yarns in another subgroup;
        stopping the laying down to form a stack when all of the plurality of first subgroups form a first yarn group comprising yarns that densely cover the predetermined fabric area, and when the stacking of all of the plurality of second subgroups form a second yarn group comprising yarns that densely cover the predetermined fabric area; and utilizing connection means to connect the yarns in the top subgroup in the stack to the yarns in the bottom subgroup in the stack to thereby contain the other subgroups in the stack and form an interlaced fabric structure.

18. The method of claim 17, further comprising:

positioning a polymeric web in contact with and bonded to a surface of one of the subgroups.

19. The method of claim 17, further comprising:

introducing a plurality of spaced binder yarns coextensive with a predetermined yarn of each subgroup and distributing the binder yarns at predetermined positions relative to other yarns in the subgroups.

\* \* \* \* \*